United States Patent [19]

Christenson et al.

[11] Patent Number: 5,597,174
[45] Date of Patent: Jan. 28, 1997

[54] STEERABLE TAG AXLE

[75] Inventors: Ronald E. Christenson, Parsons, Tenn.; Tracy L. Schrafel, West Concord; William P. Bartlett, Dodge Center, both of Minn.

[73] Assignee: McNeilus Truck and Manufacturing, Inc., Dodge Center, Minn.

[21] Appl. No.: 398,946

[22] Filed: Mar. 2, 1995

[51] Int. Cl.$^6$ ................................................. B60G 11/26
[52] U.S. Cl. ...................... 280/704; 280/711; 180/24.02; 180/209
[58] Field of Search ............................. 180/24.02, 209; 280/704, 711, 43.17, 43

[56] References Cited

U.S. PATENT DOCUMENTS

| | | | |
|---|---|---|---|
| 3,264,009 | 8/1966 | Langendorf | 280/704 |
| 3,685,853 | 8/1972 | Goldsmith | 280/81.1 |
| 3,704,896 | 12/1972 | Buelow | 280/81 |
| 3,739,927 | 6/1973 | Gollnick | 214/83.3 |
| 4,204,697 | 5/1980 | Santerre | 180/24.02 X |
| 4,492,389 | 1/1985 | Wyatt et al. | 280/704 |
| 4,705,133 | 8/1988 | Christenson et al. | 180/209 |
| 4,762,421 | 10/1987 | Christenson et al. | 364/54 |
| 4,856,814 | 8/1989 | Jones | 180/24.02 |
| 5,018,593 | 5/1991 | Hermann | 180/24.02 |
| 5,090,495 | 2/1991 | Christenson | 180/24.02 |

FOREIGN PATENT DOCUMENTS 0471621  9/1937  United Kingdom ................. 180/24.02

*Primary Examiner*—Christopher P. Ellis
*Attorney, Agent, or Firm*—Haugen and Nikolai, P.A.

[57] ABSTRACT

Steerable tag axle assemblies include an axle mounting lever carrying a wheel on a stub axle and either a kingpin pivot or a spherical bearing pivot for laterally turning the wheel. The lever pivots between a stowed position and a deployed position where lateral forces from the ground urge the wheel to follow the vehicle. In one embodiment, a kingpin pivot connects the stub axle to the lever and a tie rod maintains alignment of the pair of stub axles. In another embodiment, a kingpin pivot connects the lever to a pivoting shaft attached to the vehicle. The shaft turns as the lever moves between the deployed and stowed positions, and the lever pivots laterally at the kingpin pivot to turn the wheels. In another embodiment, a spherical bearing is carried by a spherical bearing mount securely attached to the vehicle. The bearing engages the lever in a bearing cavity, such that the lever pivots laterally and between the stowed and deployed positions on the bearing. Lateral movement of the wheel is limited in each embodiment.

29 Claims, 29 Drawing Sheets

5,597,174

STEERABLE TAG AXLE

BACKGROUND OF THE INVENTION

I. Field of the Invention

This invention relates generally to tag axle systems and, more particularly, to a steerable tag axle system that enables a deployed ground engaging tag wheel to turn laterally to reduce tire wear and stress on the tag axle assembly.

II. Discussion of the Related Art

Auxiliary axle systems or tag axles are well known in the art for augmenting the load carrying capabilities of hauling vehicles. Tag axles carry a wheel which may be deployed to a ground engaging position or raised to a stowed position. The tag axle provides an additional axle to keep a loaded vehicle within legal per axle weight restrictions imposed by state or federal governments.

U.S. Pat. No. 5,090,495, issued to Ronald E. Christenson, an inventor herein, and assigned to the same assignee as the present invention, describes a tag axle system including a pair of spaced stub axles having independently operated suspension systems for lowering and raising the associated wheel. The system may be adapted to any load hauling vehicle and is well suited for use on rear unloading vehicles, such as dump trucks or refuse trucks, an example of which is a rear loading refuse truck having a rear refuse receiving hopper swept by an hydraulic compacting mechanism. In such a refuse truck, the loading trough area or tailgate hopper extends a considerable distance behind the rear axle and below the frame of the truck, as described and illustrated in U.S. Pat. No. 3,739,927, to Gollnick, the disclosure of which is hereby incorporated by reference. The stub axles of the '495 system are positioned behind the rear axle and on each side of the tailgate. In the ground engaging position, the tag axles produce a leveraging effect around the rear axle to assume some of the weight carried by the rear wheels and distribute weight to the front wheels. However, since the wheels are not steerable, excessive tire wear and stress on the associated tag axle assembly may occur as the vehicle negotiates a turn or the like.

Tag axle systems including steerable wheels have been built using conventional kingpin and tie rod turning assemblies. U.S. Pat. Nos. 4,705,133 and 4,762,421, issued to Ronald E. Christenson and Garwin B. McNeilus and assigned to the same assignee as the present invention, describe tag axle systems which are lowered from the rear of a vehicle and carry wheels on spaced stub axles pivotally attached as by kingpin turning assemblies. The wheels are held substantially away from the rear of the vehicle and a tie rod is disposed between them to maintain alignment. This steering system works well on tag axles wherein the wheels can be in direct communication without interfering with operation of the vehicle. However, where the tag axle wheels are held near the rear of a rear unloading vehicle this conventional steering system will interfere with unloading operations. Also, a conventional kingpin and tie rod assembly will interfere with the use of a low hanging tailgate, such as a tailgate hopper on a rear loading refuse truck.

OBJECTS

It is accordingly a principal object of the present invention to provide an improved steerable tag axle system.

Another object of the invention is to provide a steerable tag axle system for a rear unloading vehicle.

Yet another object of the invention is to provide a steering system for tag axle wheels located rearward in a rear unloading vehicle.

Still another object of the invention is to provide a steering system for either a frame mounted or a tailgate mounted tag axle.

Yet still another object of the invention is to provide a steerable tag axle system for a rear unloading vehicle having a low hanging tailgate.

A further object of the invention is to provide a steerable tag axle system for a rear loading refuse truck.

A still further object of the invention is to provide an improved kingpin steering system for a tag axle.

A yet still further object of the invention is to provide a kingpin steering system for tag axle wheels located rearward of a rear unloading vehicle.

Still yet another object of the invention is to provide a kingpin steering system for either a frame mounted or a tailgate mounted tag axle.

Yet still another object of the invention is to provide a kingpin steering system for a tag axle on a rear unloading vehicle having a low hanging tailgate.

A further object of the invention is to provide a kingpin steering system for a tag axle on a rear loading refuse truck.

A still further object of the invention is to provide a steerable tag axle system for independently operating tag axle assemblies.

A yet still further object of the invention is to provide a steering system on a tag axle mounting lever enabling lateral turning of the lever.

Yet another object of the invention is to provide a kingpin steering system for turning an axle mounting lever.

Still another object of the invention is to provide a spherical bearing pivot for turning an axle mounting lever.

Yet still another object of the invention is to provide a lateral stop for limiting lateral movement of an axle mounting lever.

Other objects, features and advantages of the present invention will become apparent to those skilled in the art through familiarity with the summary of the invention, detailed description, claims and drawings herein.

SUMMARY OF THE INVENTION

The foregoing objects of the present invention are met by providing an improved steering system for a tag axle assembly. The steerable tag axle assembly includes a pivot, which may be a kingpin or a spherical bearing pivot, attached to an axle mounting lever to enable the lateral turning of a wheel carried by the lever. The steering system is passive, in that it responds to the vicissitudes of vehicular travel to laterally turn the wheel as needed. However, it is contemplated that active steering systems could be constructed using the ideas of the present invention. The wheel may be deployed or stowed conventionally. As deployed, lateral forces from the ground urge the wheel to follow the path of the vehicle.

The steerable tag axle may be attached to any load hauling vehicle, including a refuse truck or a dump truck. The tag axle may be positioned anywhere along the vehicle, such as between the front and rear axles or behind the rear axle. As mounted to the rear of the vehicle, it may be attached to the truck frame or a tailgate. The embodiments of the invention described herein are particularly well suited for use on a rear loading refuse truck but can be Used on other vehicles, including side and front loading refuse trucks.

The steerable tag axle may take any of several forms depending on the application. These include, inter alia, stub axle and through axle mounts, different kinds of fluid (hydraulic or pneumatic) deployment systems and kingpin or spherical bearing based steering. The tag axle systems described herein include axle mounting levers which carry a stub axle and a wheel rotatably attached to the axle. The axle mounting levers are rotatably or pivotally attached to the truck frame or tailgate to pivot vertically between the deployed and stowed positions by operating fluid operated actuators.

In one such system, a torque lever arm is securely attached to an axle mounting lever and rotatably or pivotally attached to a plurality of actuators which are, in turn, rotatably or pivotally attached to the truck frame or the tailgate. The actuators rotate or adjust their position as they extend and retract to lower and raise the wheel. The actuators may be pneumatic springs or hydraulic cylinders. Such a system is described and shown in the above-referenced U.S. Pat. No. 5,090,495, the disclosure of which is hereby incorporated by reference.

In another system, a plurality of pneumatic springs are each non-rotatably or non-pivotally attached between a faceplate secured to the axle mounting lever and the frame or tailgate of the vehicle. The pneumatic springs extend and retract to lower and raise the wheel. In yet other systems, a double acting hydraulic cylinder is attached with lugs to a faceplate secured to the axle mounting lever or directly attached to the axle mounting lever for lowering and raising the ground engaging wheel. Essentially any of these deployment systems could be used with the embodiments of the invention described herein.

The steering system of the present invention is positioned at the stub axle or at the axis for pivoting the axle mounting lever between the deployed and stowed positions. In one embodiment, a kingpin steering assembly is mounted between the axle mounting lever and the stub axle. An elongated tie rod lever arm is securely attached to each stub axle and adjustably attached to a tie rod which maintains wheel alignment.

In another embodiment, a kingpin steering assembly is attached between the axle mounting lever and a horizontal torque shaft or torque tube journalled for rotation about its central axis in bearings securely attached to the underside of the vehicle. The horizontal torque shaft connects axle mounting levers positioned on each side of the vehicle and rotates or pivots as the axle mounting levers move vertically. Two end pieces or mounting flanges having holes are securely attached to each end of the shaft such that the central axis of the holes is transverse to the central axis of the shaft. A kingpin pivot pin is inserted through the mounting flanges and a fork in the axle mounting lever. As the axle mounting levers move vertically, the horizontal torque shaft pivots due to forces exerted by the kingpin pivot pin on the mounting flanges. The axle mounting levers pivot laterally about the kingpin pivot pin to turn the wheels and follow the vehicle. In this embodiment, the entire axle mounting lever moves from side to side to laterally turn the wheel. Lateral movement is limited by openings in blocks secured to the horizontal shaft near each end cooperating with adjustable limit screws threaded in the axle mounting lever.

In a spherical bearing embodiment, each axle mounting lever is mounted for pivoting laterally and between the deployed and stowed positions on a spherical bearing. The axle mounting levers carry the stub axle and wheel at one end and have a bearing cavity at the other. A bearing pivot pin is inserted through the bearing which is lubriciously engaged with the cavity. The pivot pin is secured to a flanged bearing mount which is, in turn, secured to the vehicle. This holds the axle mounting lever in place for pivoting. The axle mounting lever pivots vertically between stowed and deployed positions, essentially about the central axis of the bearing pivot pin and laterally around the spherical bearing. A slot roller secured to the axle mounting lever rides inside a slot bracket secured to the vehicle to limit lateral displacement and maintain camber.

The embodiments of the present invention described herein may be used on any type of load hauling vehicle. By way of example, the embodiments are described and shown on rear loading and front loading refuse trucks. In these examples, the tag axle system is mounted to the tailgate or the frame. However, it could be mounted to the body.

DETAILED DESCRIPTION

Figure 1:
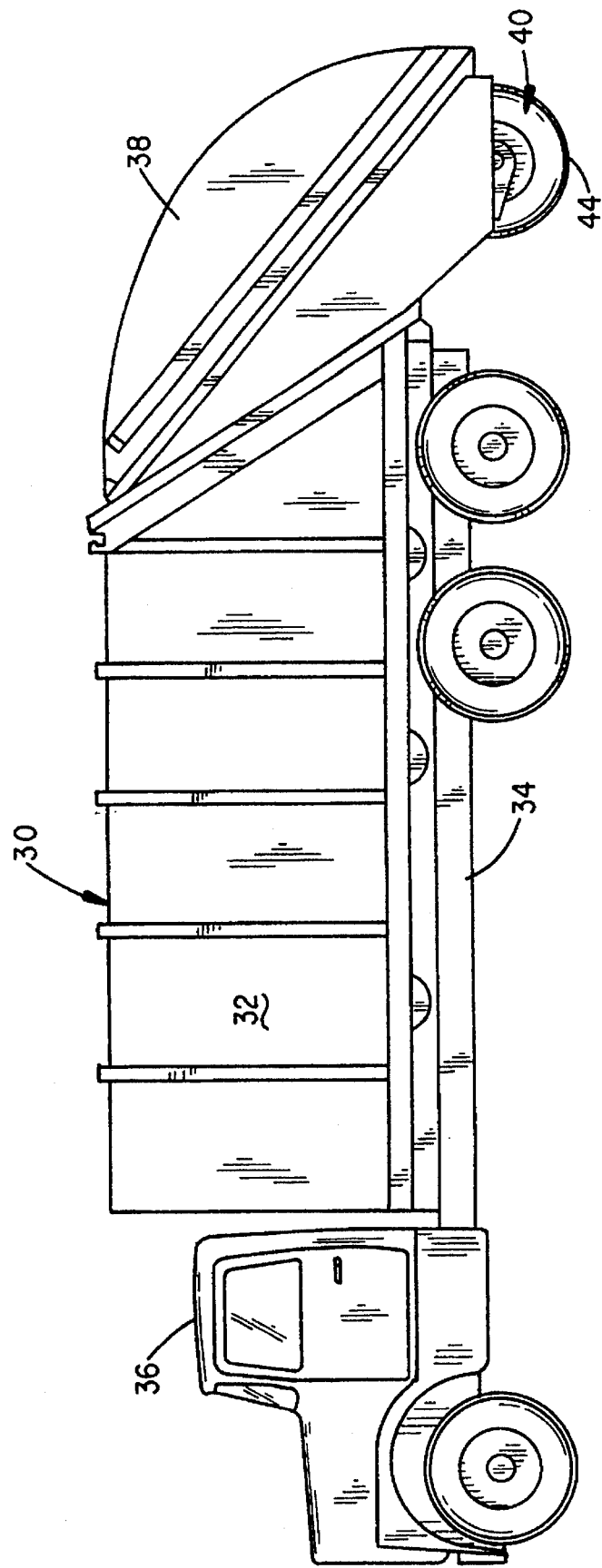
FIG. 1 is a side view of a rear loading refuse truck including a tailgate hopper with an attached steerable tag axle system in the deployed ground engaging position.

FIGS. 1–4 illustrate a rear loading refuse vehicle 30 which having a steerable tag axle in accordance with the present invention. The vehicle 30 is a typical rear loading refuse vehicle including a material holding body 32 and cab section 36 attached to a chassis frame 34. A rear loading tailgate 38 is pivotally attached to the top and rear of the body 32 and includes an hydraulic compacting mechanism (not shown) for sweeping refuse into the body 32. A steerable tag axle assembly, indicated generally by the numeral 40, carries a wheel 44 and is attached to the tailgate 38. A similar tag axle assembly is attached to the other side of the vehicle 30.

Figure 2:
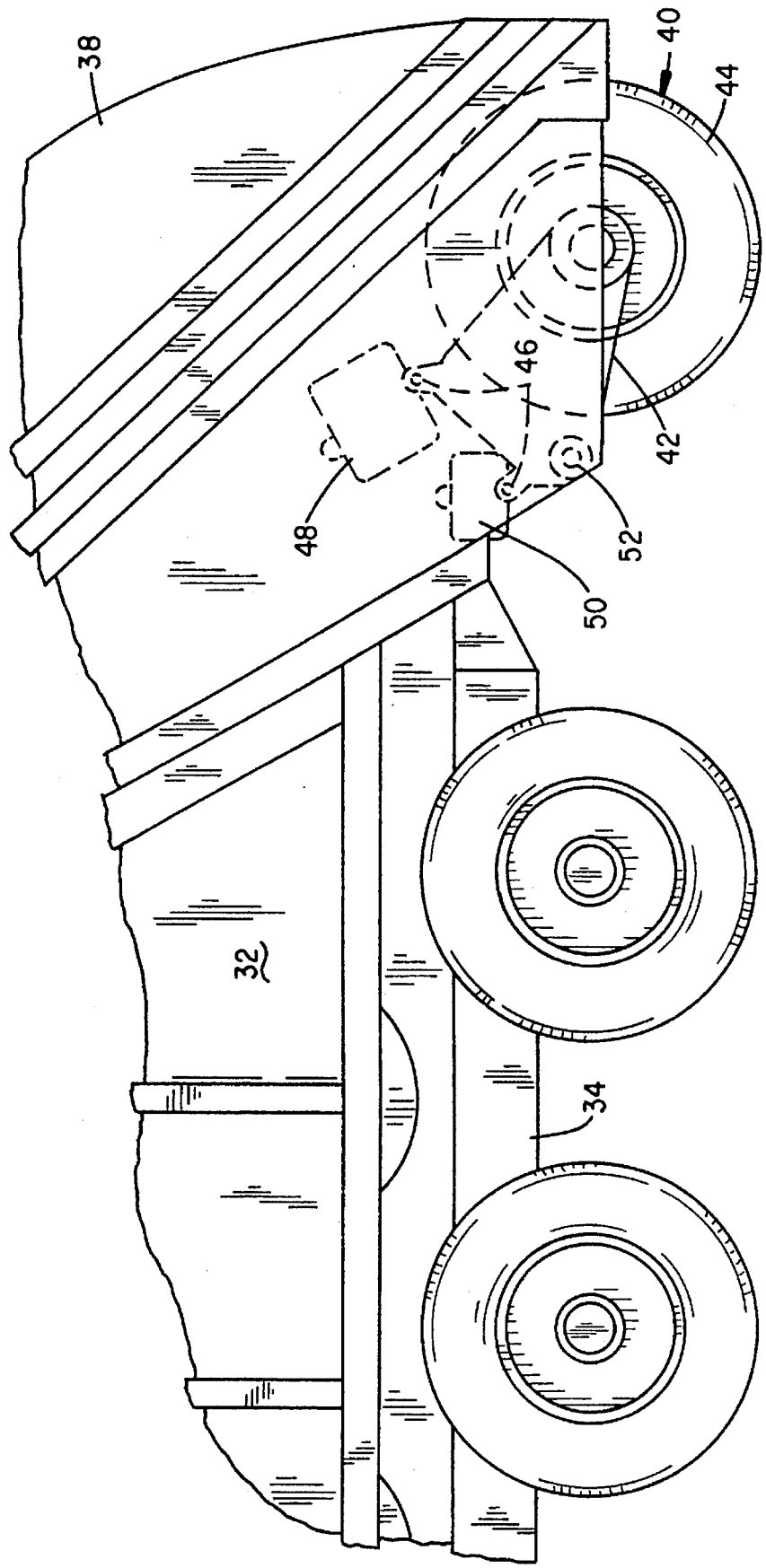
FIG. 2 is an enlarged side view of the tailgate of FIG. 1 showing a hidden axle mounting lever and pneumatic springs in dashed lines.
Figure 3:
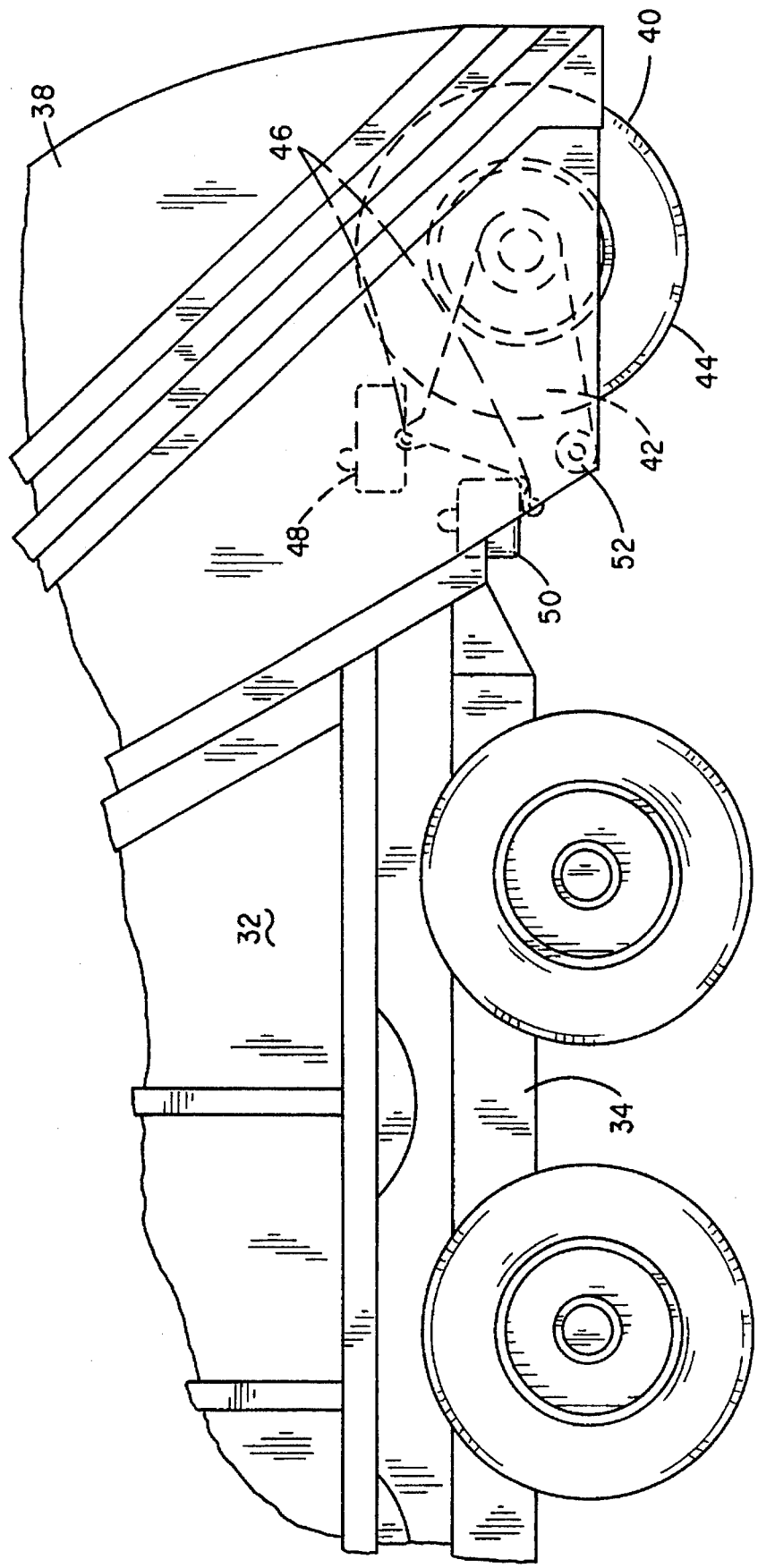
FIG. 3 is an enlarged fragmentary side view of the tailgate of FIG. 1 showing the steerable tag axle system in the stowed position.
Figure 4:
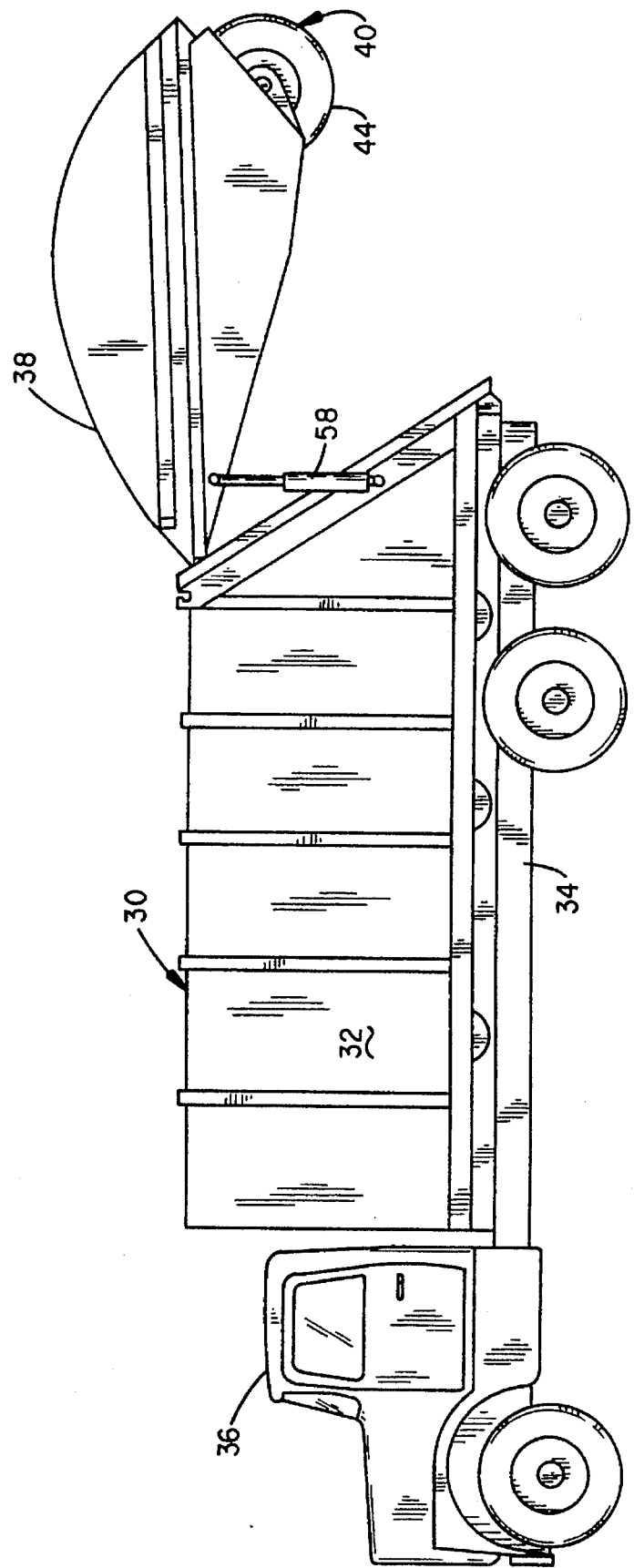
FIG. 4 is a side view of the refuse truck of FIG. 1 Showing the steerable tag axle system and the tailgate raised for unloading.

As shown in FIGS. 2 and 3, the steerable tag axle assembly 40 includes a wheel carrying axle mounting lever 42 pivotally or rotatably attached to the tailgate 38 at spherical bearing pivot 52. The axle mounting lever 42 is operated between the deployed and stowed positions by pneumatic springs 48 and 50. A torque lever arm 46, which is part of the axle mounting lever 42, is rotatably or pivotally attached to the springs 48 and 50 which are, in turn, rotatably or pivotally attached to the tailgate 38. Springs 48 and 50 rotate or adjust their positions as they expand and retract to lower and raise the axle mounting lever 42 and wheel 44. To unload the vehicle 30, the tailgate 30 and tag axle 40 are lifted by tailgate hydraulic cylinders 58 which are situated on each side of the vehicle 30, FIG. 4. Refuse is discharged from the body 32 by a conventional fluid operated ram (not shown).

Figure 5:
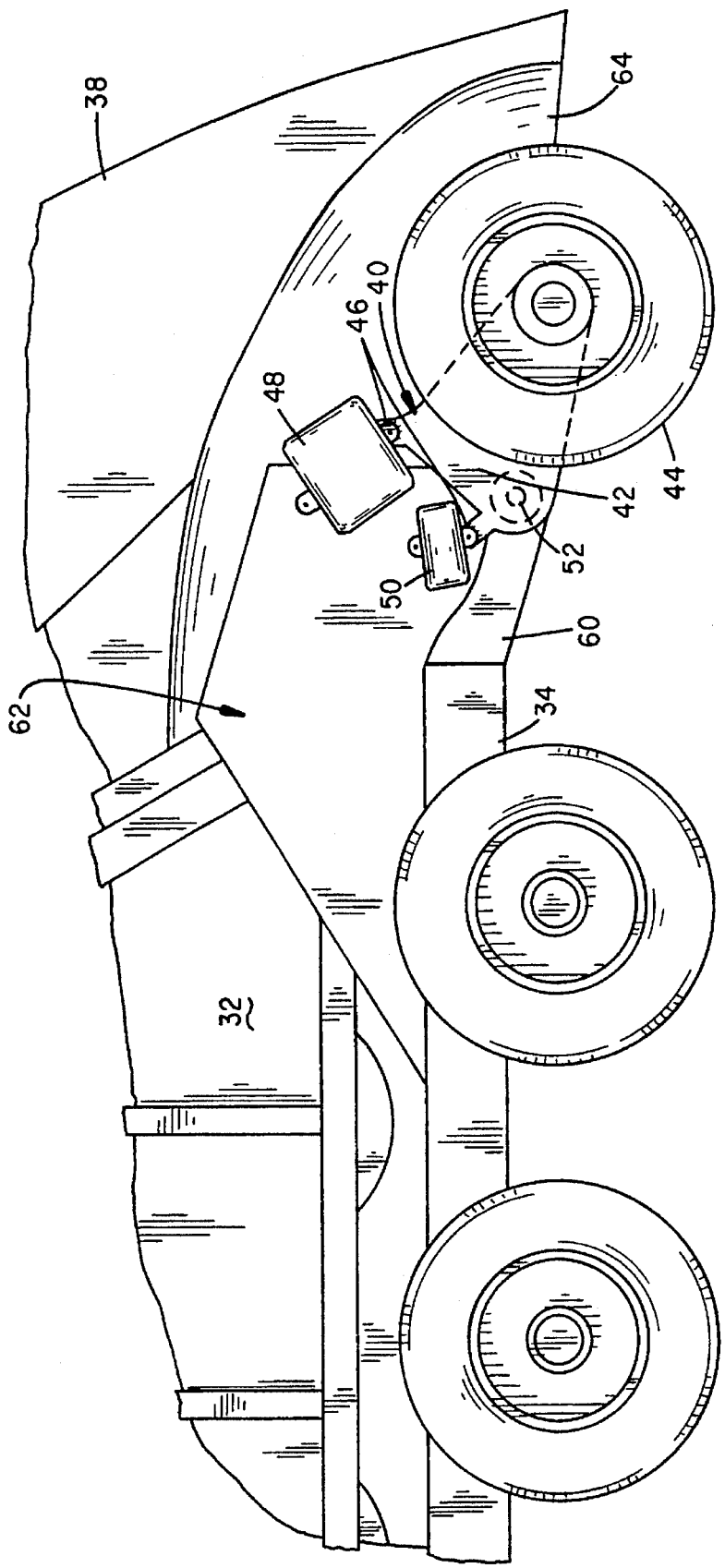
FIG. 5 is an enlarged fragmentary side view of a rear loading refuse truck including a frame mounted steerable tag axle system in the deployed ground engaging position.
Figure 6:
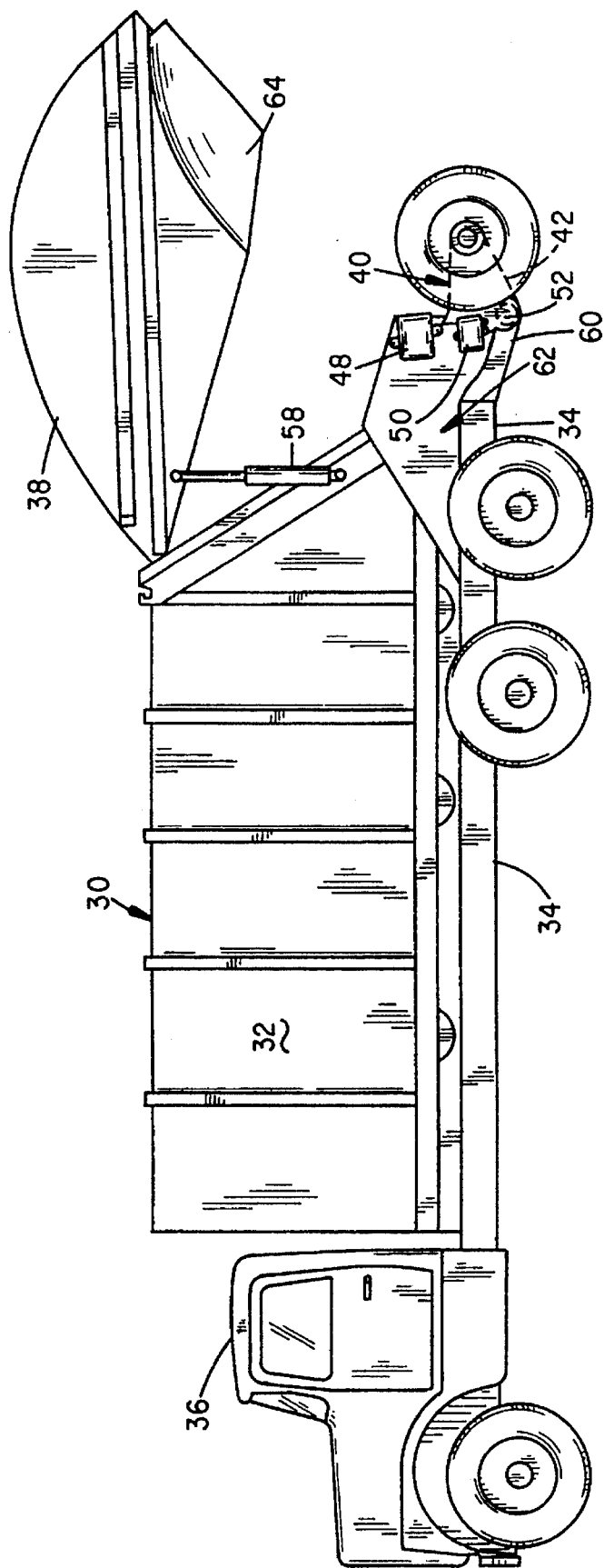
FIG. 6 is a side view of the refuse truck of FIG. 5 showing the steerable tag axle system in the stowed position and the tailgate raised for unloading.

As shown in FIGS. 5 and 6, the steerable tag axle assembly 40 may alternatively be attached to the frame 34, such as at spherical bearing pivot 52 on frame extension 60. Pneumatic actuators 48 and 50 are pivotally connected between the axle mounting lever 42 and a tag axle frame mount 62 which is secured to the frame 34 and frame extension 60 in a conventional manner, such as by welding or with bolts. The tailgate 38 includes a tag axle wheel well 64 for accommodating the tag axle system 40. The steerable tag axle 40 may be raised to the stowed position, FIG. 6, while the tailgate 38 is lifted for unloading refuse. Of course, the tag axle 40 could be in the ground engaging position during unloading operations. As described below, tag axle assemblies including an embodiment of the steering system of the present invention may be operated by either pneumatic springs or hydraulic cylinders.

Figure 7:
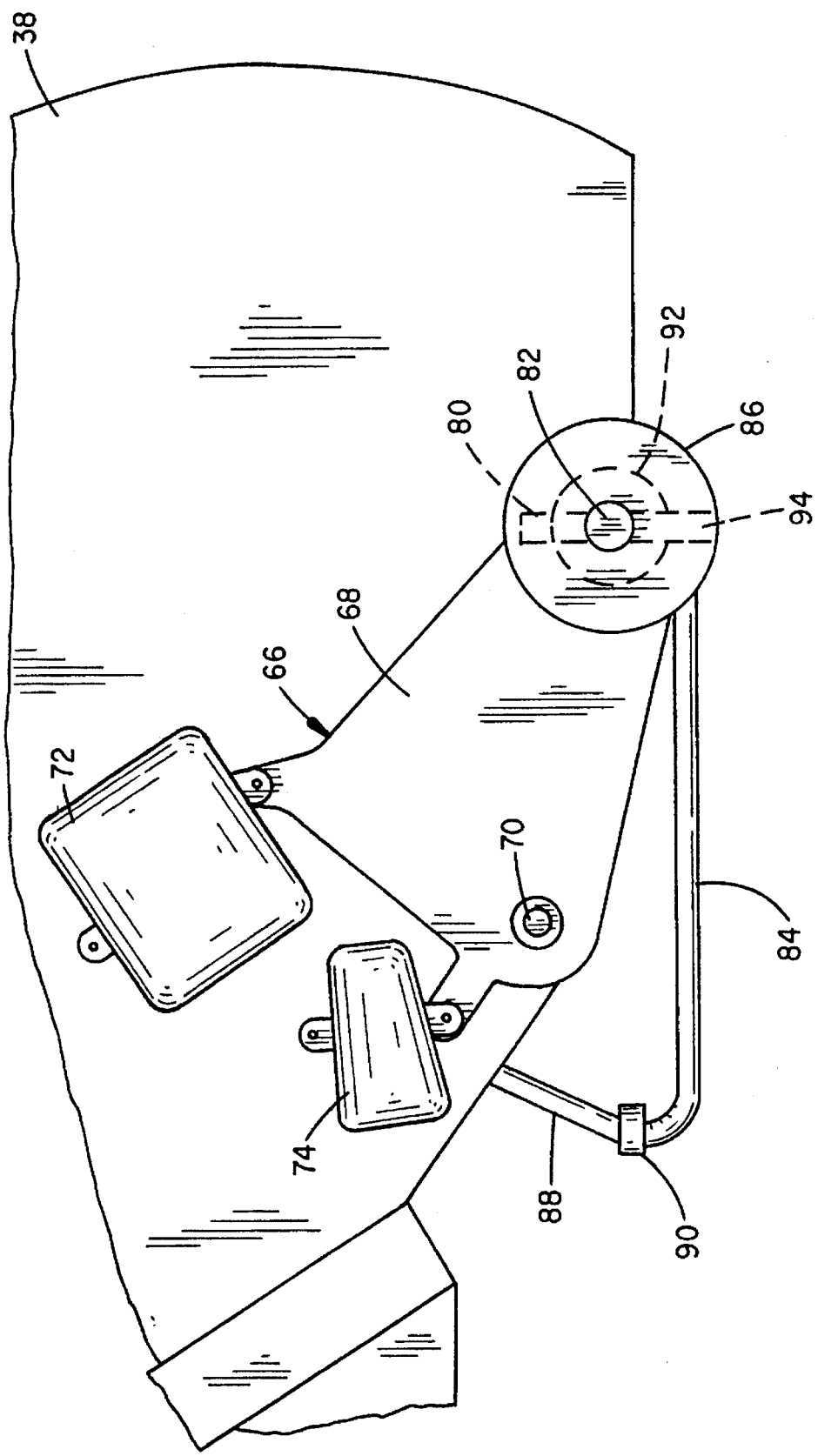
FIG. 7 is an enlarged fragmentary side view of a pivoting pneumatic spring operated steerable tag-axle system including a kingpin pivot and an elongated tie rod extension at the stub axle which is shown deployed but without a wheel.
Figure 8:
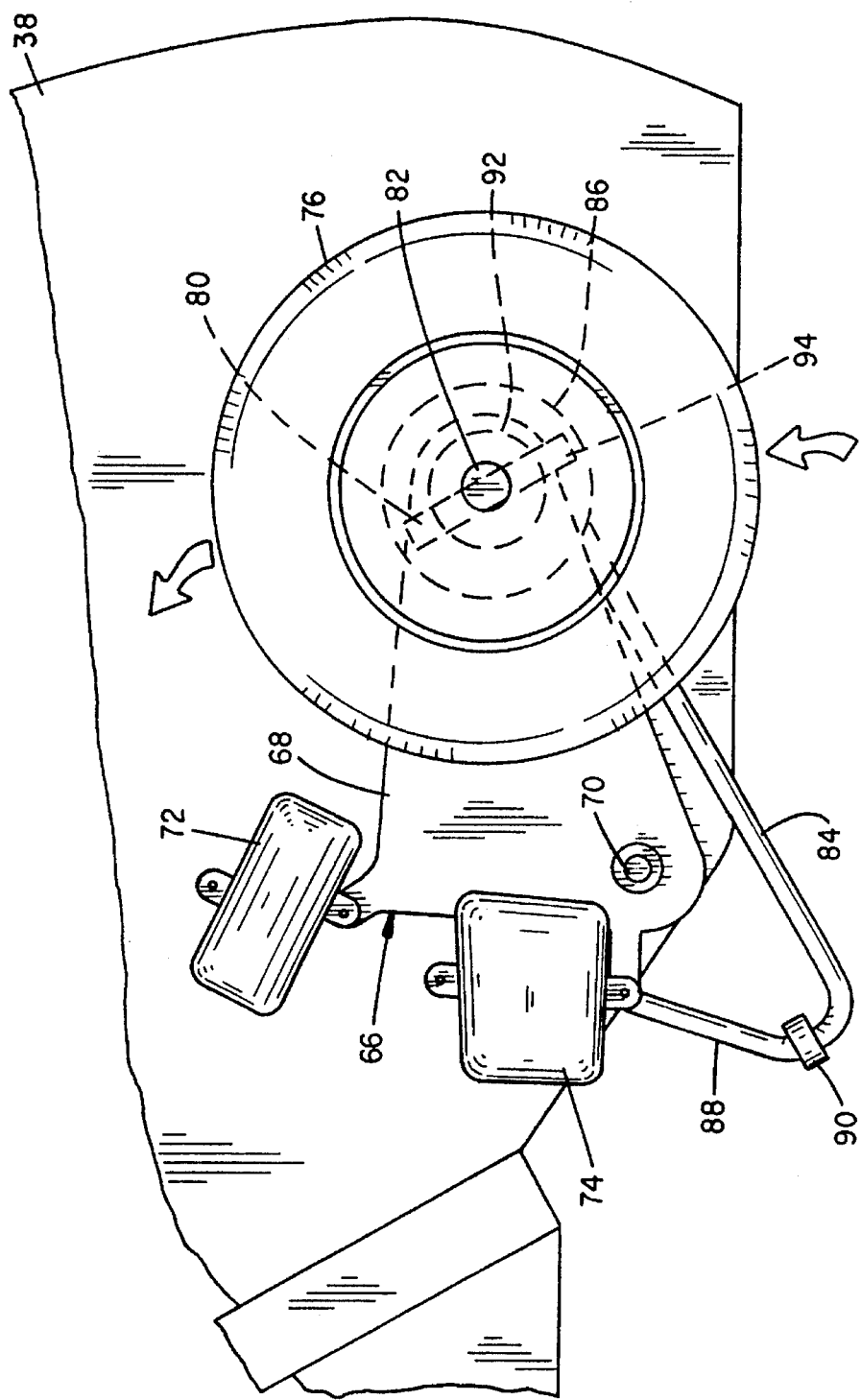
FIG. 8 is an enlarged fragmentary side view of the steerable 5 tag axle system of FIG. 7 in the stowed position.
Figure 9:
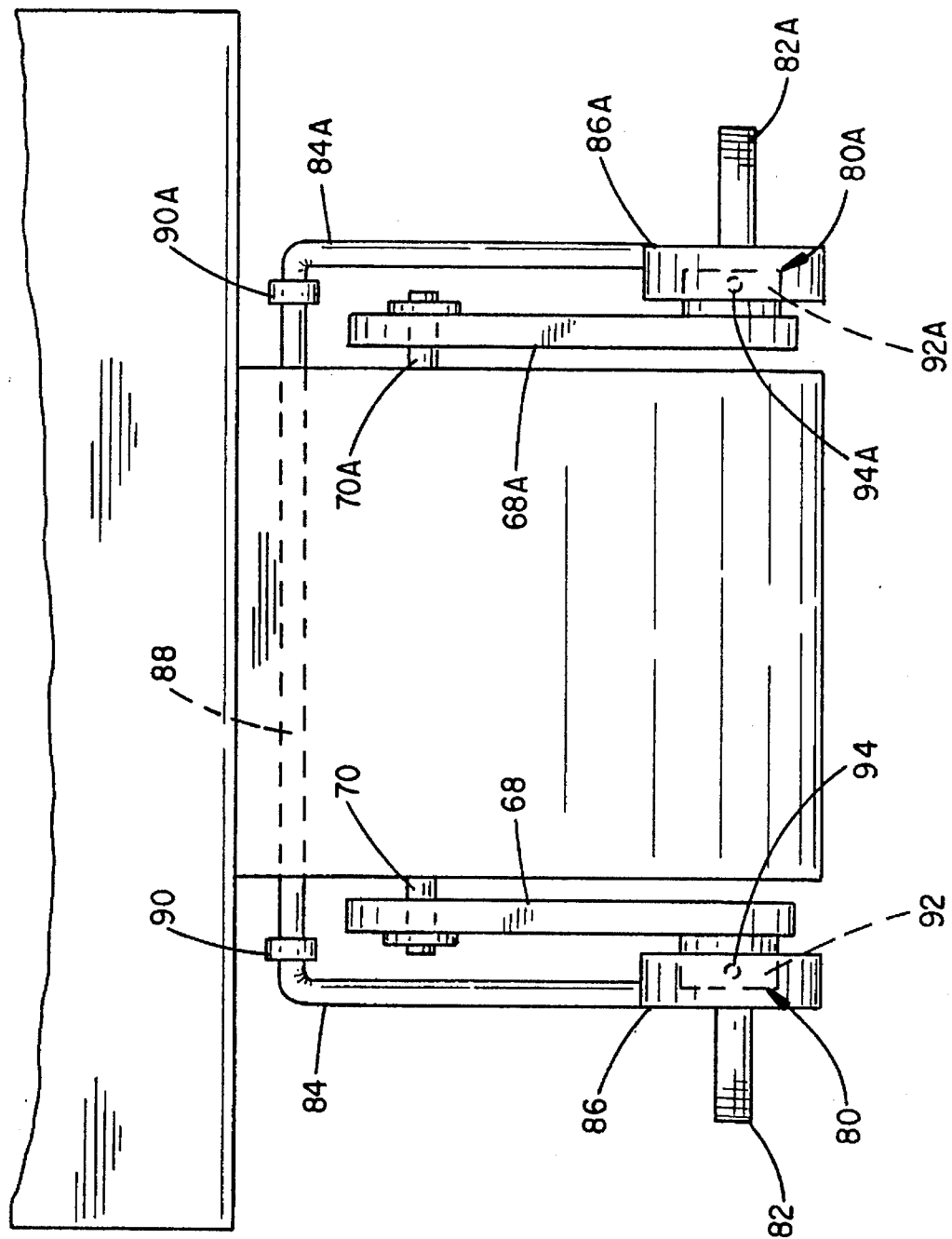
FIG. 9 is a fragmentary rear plan view of the steerable tag axle system of FIG. 7 showing a tie rod for maintaining alignment of the two stub axles.

One embodiment of the steering system of the present invention is shown in FIGS. 7–9 as part of a pneumatic spring operated, torque lever arm tag axle system 66 pivotally mounted to the tailgate 38. Kingpin steering assemblies, indicated by the numerals 80 and 80A, FIG. 9, are connected between stub axles 82 and 82A and the respective axle mounting levers 68 and 68A. Stub axles 82 and 82A are maintained in alignment by a tie rod 88 connected as by flexible joints 90 and 90A between elongated tie rod lever arms 84 and 84A which are securely attached to stub axle hubs 86 and 86A. As either stub axle 82 or 82A pivots, the other follows.

The kingpin steering assemblies 80 and 80A include inner hubs 92 and 92A securely attached to axle mounting levers 68 and 68A and fit inside the stub axle hubs 86 and 86A in a pivotal connection. Kingpin pivot pins 94 and 94A hold the inner hubs 92 and 92A in the stub axle hubs 86 and 86A for limited pivoting motion about the kingpins 94 and 94A to turn the attached wheels 76. Lateral motion of the stub axles 82 and 82A is limited by contact between the stub axle hubs 86 and 86A and the inner hubs 92 and 92A.

The steerable tag axle system 66 pivots vertically, in a conventional manner, about pivots 70 and 70A between the ground engaging position, FIG. 7, and the stowed position, FIG. 8. Pneumatic springs 72 and 74 extend and retract to raise and lower the axle mounting lever 68. Similarly, pneumatic springs on the other side (not shown) extend and retract to raise and lower axle mounting lever 68A. In the ground engaging position, kingpins 94 and 94A are approximately vertical, such that attached wheels 76 may pivot laterally due to forces exerted by the ground as the vehicle 30 turns.

Another embodiment of the steering system of the present invention is shown in FIGS. 10–14 as part of a double-acting hydraulic cylinder actuated tag axle assembly 102 mounted to a tailgate 38. The steerable tag axle assemblies 102, mounted on each side of the tailgate 38, include kingpin steering systems, indicated generally by the numerals 100 and 100A in FIG. 12. The kingpin steering systems 100 and 100A are attached to axle mounting levers 104 and 104A and a common pivoting horizontal shaft 112.

Figure 10:
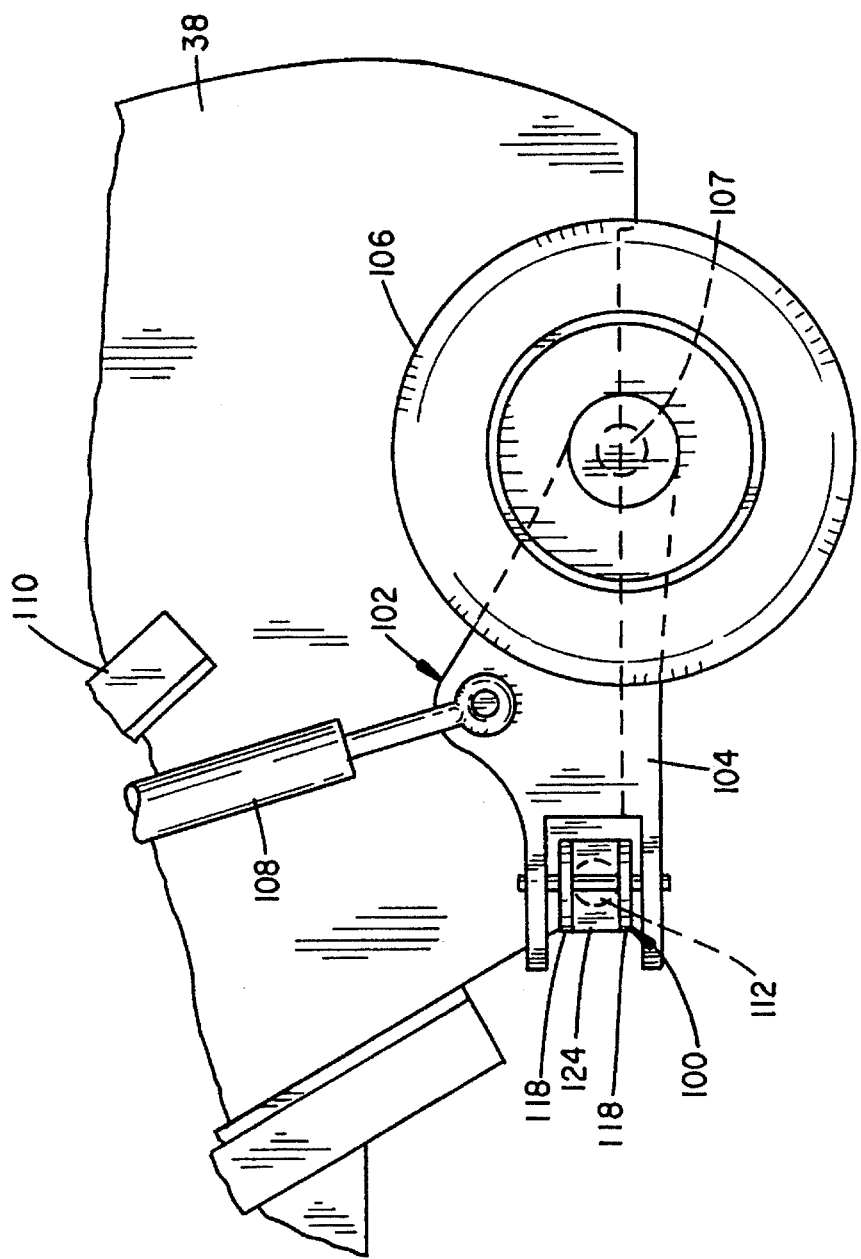
FIG. 10 is an enlarged fragmentary side view of an hydraulically operated steerable tag axle system in the deployed position and including a kingpin pivot on a horizontal pivoting shaft.
Figure 11:
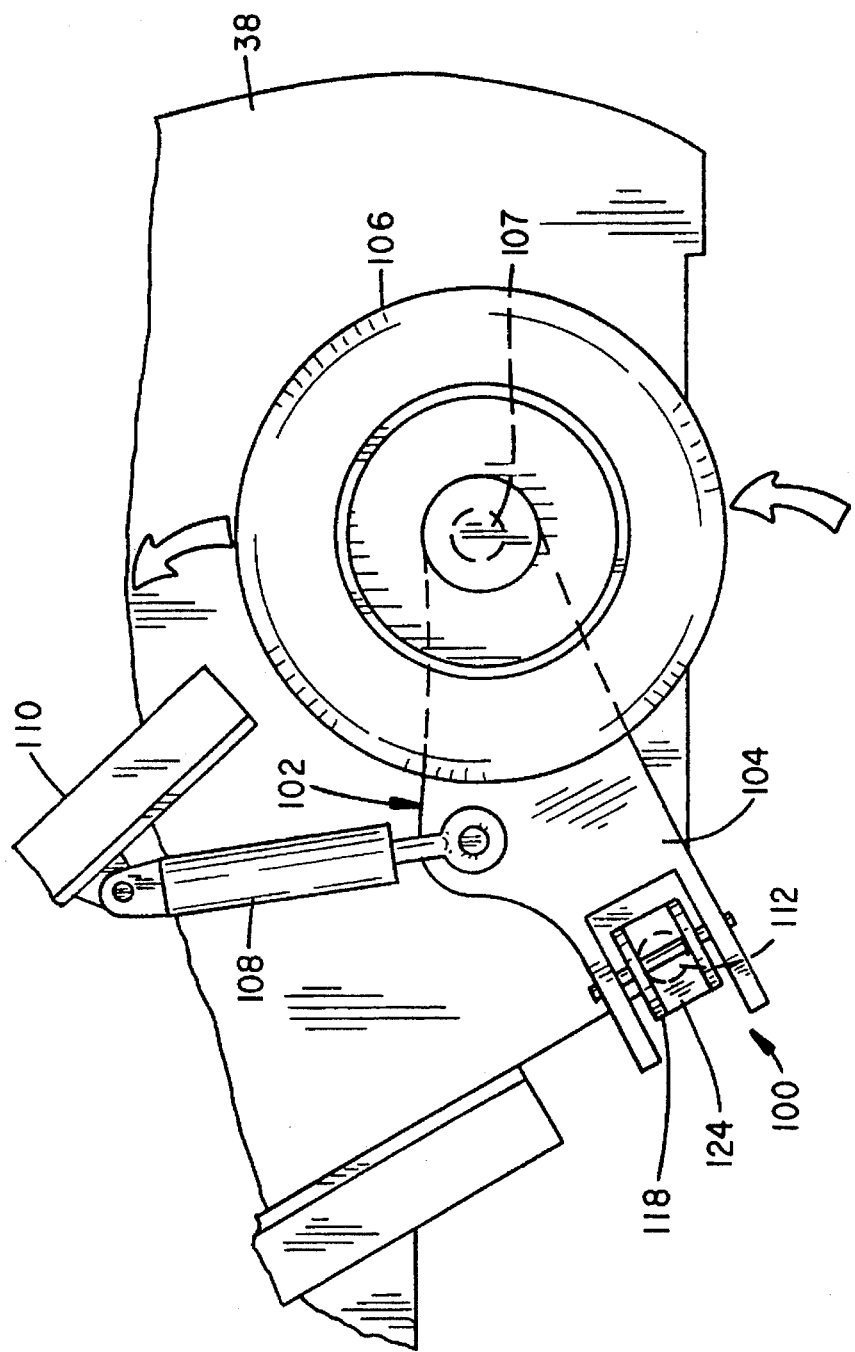
FIG. 11 is an enlarged fragmentary side view of the steerable tag axle system of FIG. 10 in the stowed position.

As shown in FIGS. 10 and 11, each assembly 102 is operated by a single double-acting hydraulic cylinder 108 pivotally attached between a tag axle support 110 secured to the tailgate 38 and an axle mounting lever 104 pivotally attached to the pivoting shaft 112. A wheel 106 is carried on a stub axle 107 fixed to the axle mounting lever 104 and the shaft 112 is rotatably or pivotally attached to the underside of the tailgate 38. Extending the cylinder 108 deploys the wheel 106 (FIG. 10), and retracting the cylinder 108 stows the wheel 106 (FIG. 11). Of course, the pivoting shaft 112 and the cylinder 108 could be attached to the frame 34 of the refuse vehicle 30, as well. In this latter situation, of course, the steerable tag axle assembly 102 would operate independently of the tailgate 38.

Figure 12:
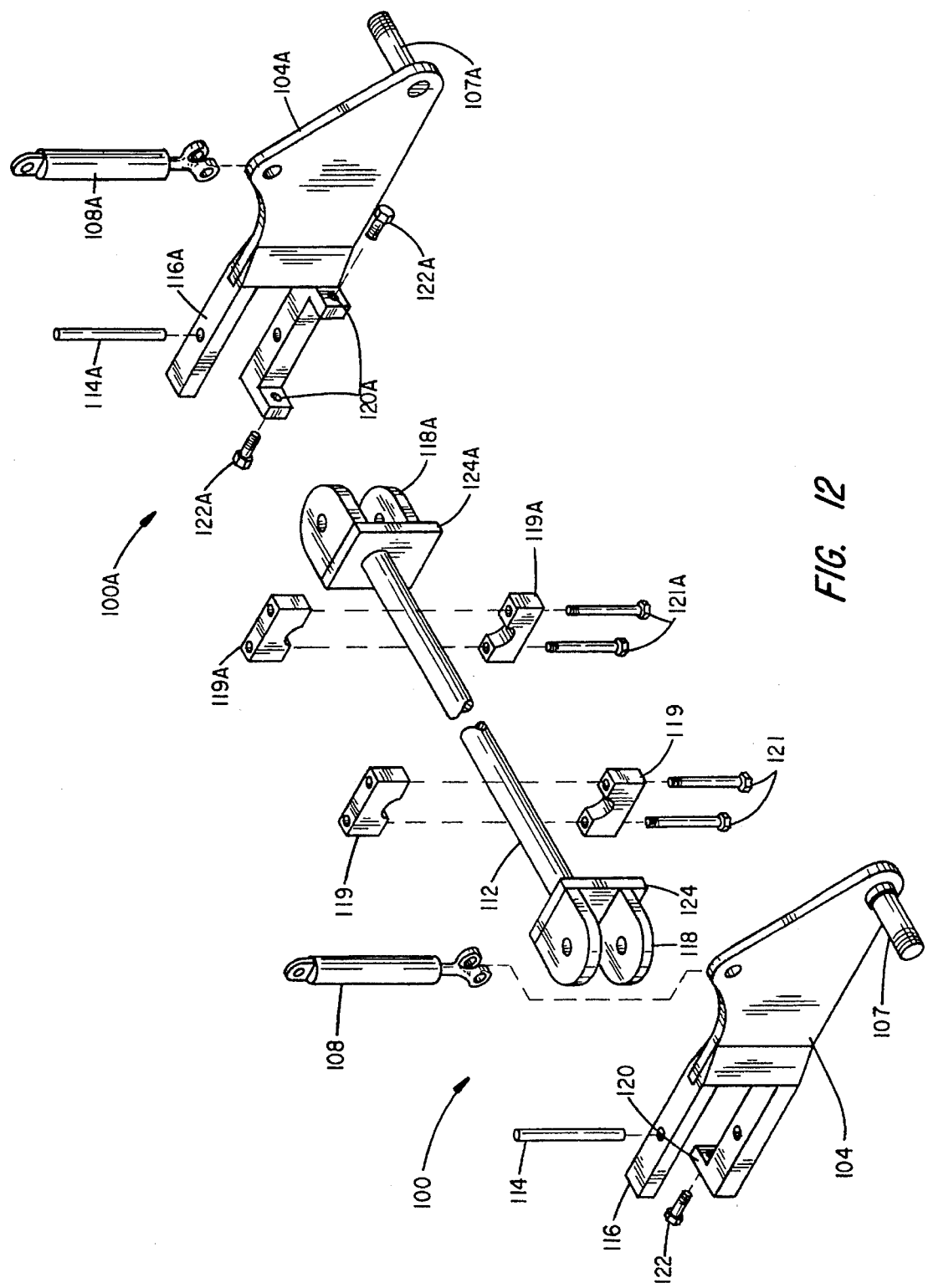
FIG. 12 is an exploded view of the steerable tag axle system of the tag axle assembly of FIG. 10 showing the horizontal shaft, axle mounting levers and kingpins.

As shown in FIG. 12, the kingpin steering systems 100 and 100A include kingpin pivot pins 114 and 114A which are inserted through holes in mounting forks 116 and 116A of the axle mounting levers 104 and 104A. The common pivoting shaft 112 has attached end pieces or mounting flanges as at 118 and 118A which are inserted between the prongs of the forks 116 and 116A and held in place by the kingpin pivot pins 114 and 114A to pivotally connect the shaft 112 to the axle mounting levers 104 and 104A. The shaft 112 is journal mounted for rotation or pivoting about its major axis in support bearings 119 and 119A which are secured to the underside of the tailgate 38, (or alternatively to the frame 34), such as with bolts 121 and 121A. Axle mounting levers 104 and 104A displace laterally to turn the wheels 106 and vertically to deploy and stow the wheels 106.

Figure 13:
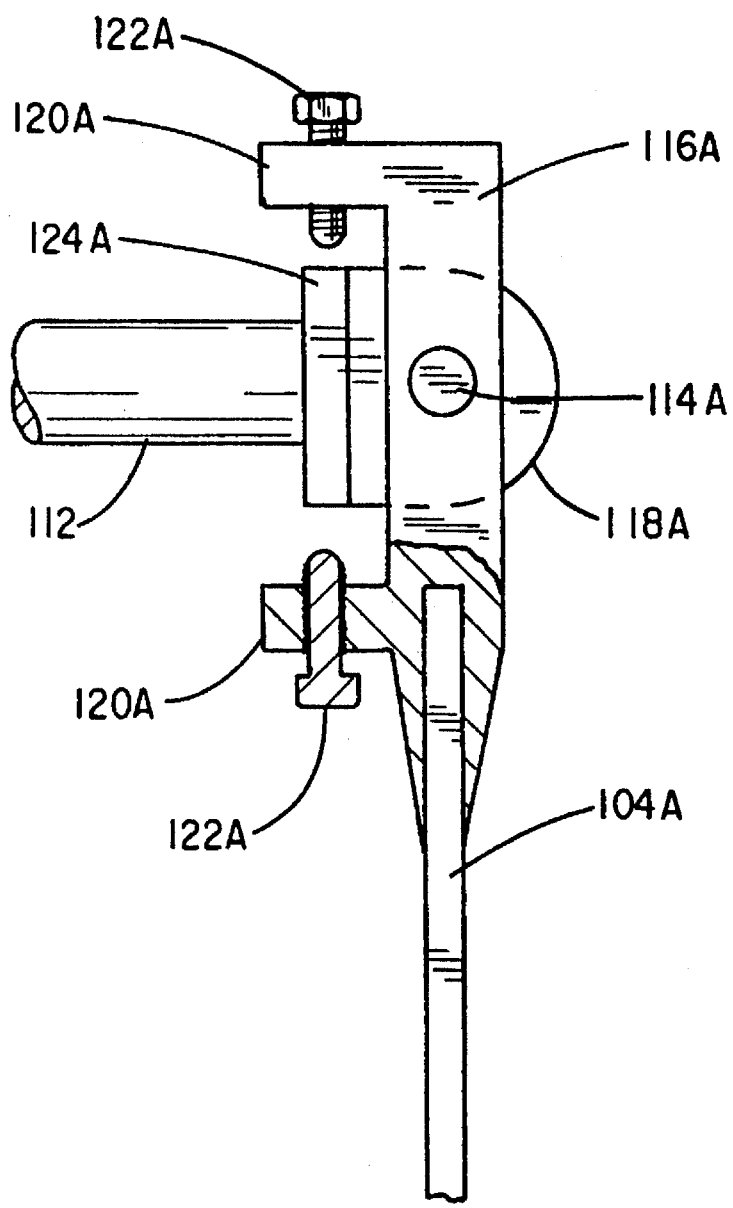
FIG. 13 is a greatly enlarged fragmentary detail of the steerable tag axle assembly of FIG. 10 showing stops for limiting lateral movement.
Figure 14:
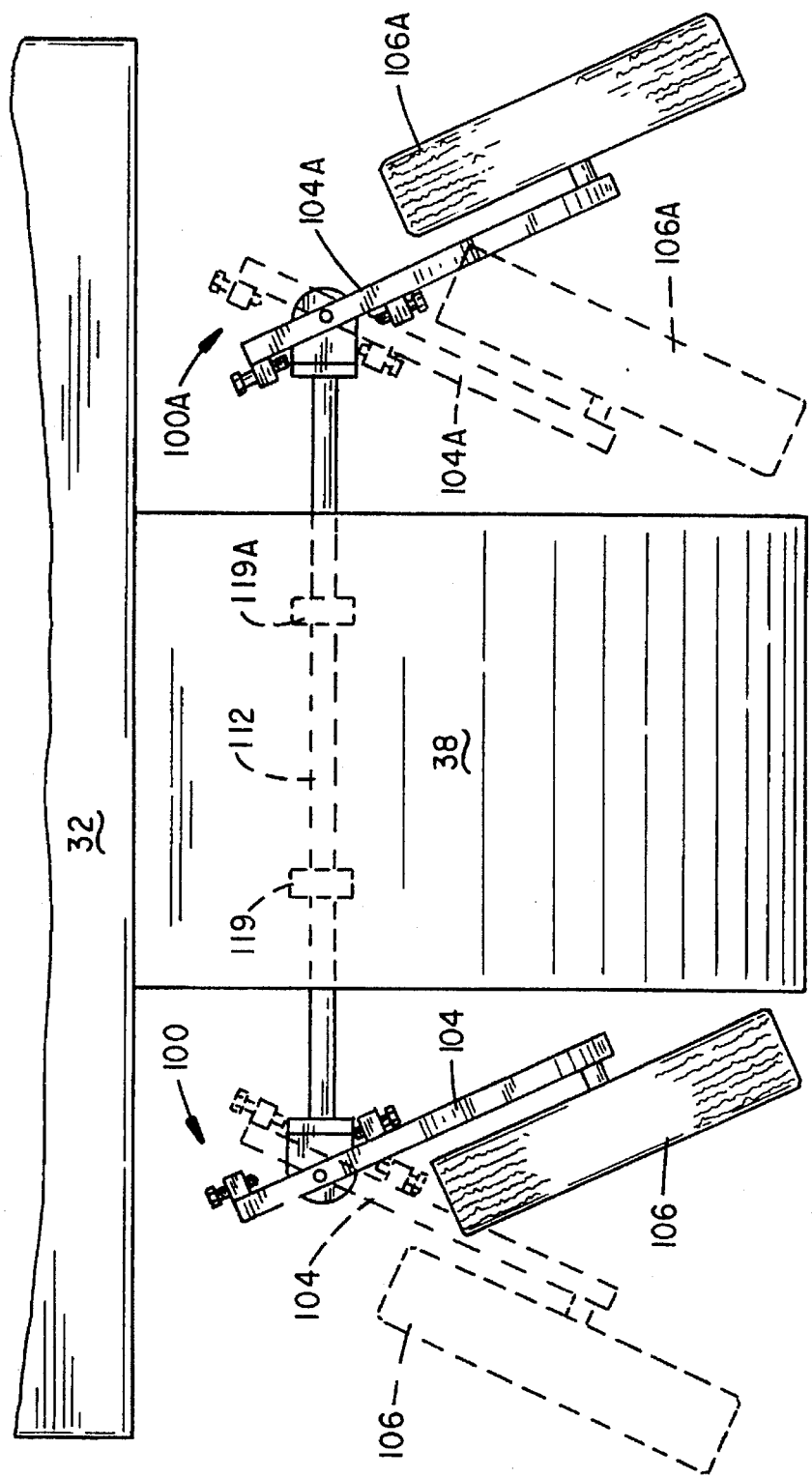
FIG. 14 is a plan view of the steerable tag axle system of the tag axle assembly of FIG. 10 showing the axle mounting levers and wheels turned one way in solid lines and another in dashed lines.

As shown in FIGS. 12–14, lateral or side to side movement of the axle mounting levers 104 and 104A is limited by adjustable screws 122 and 122A threaded in lever stops 120 and 120A secured to one prong of the forks 116 and 116A. The screws 122 and 122A contact stop blocks 124 and 124A securely attached to the horizontal shaft 112. The axle mounting levers 104 and 104A pivot laterally at the kingpin steering systems 100 and 100A in response to forces acting upon a deployed wheel 106. Thus, the wheels 106 and the axle mounting levers 104 and 104A usually turn together as shown in solid and dashed lines in FIG. 14. The cylinders 108 and 108A and the common pivoting shaft 112 move the axle mounting levers 104 and 104A and wheels 106 vertically in unison.

Figure 15:
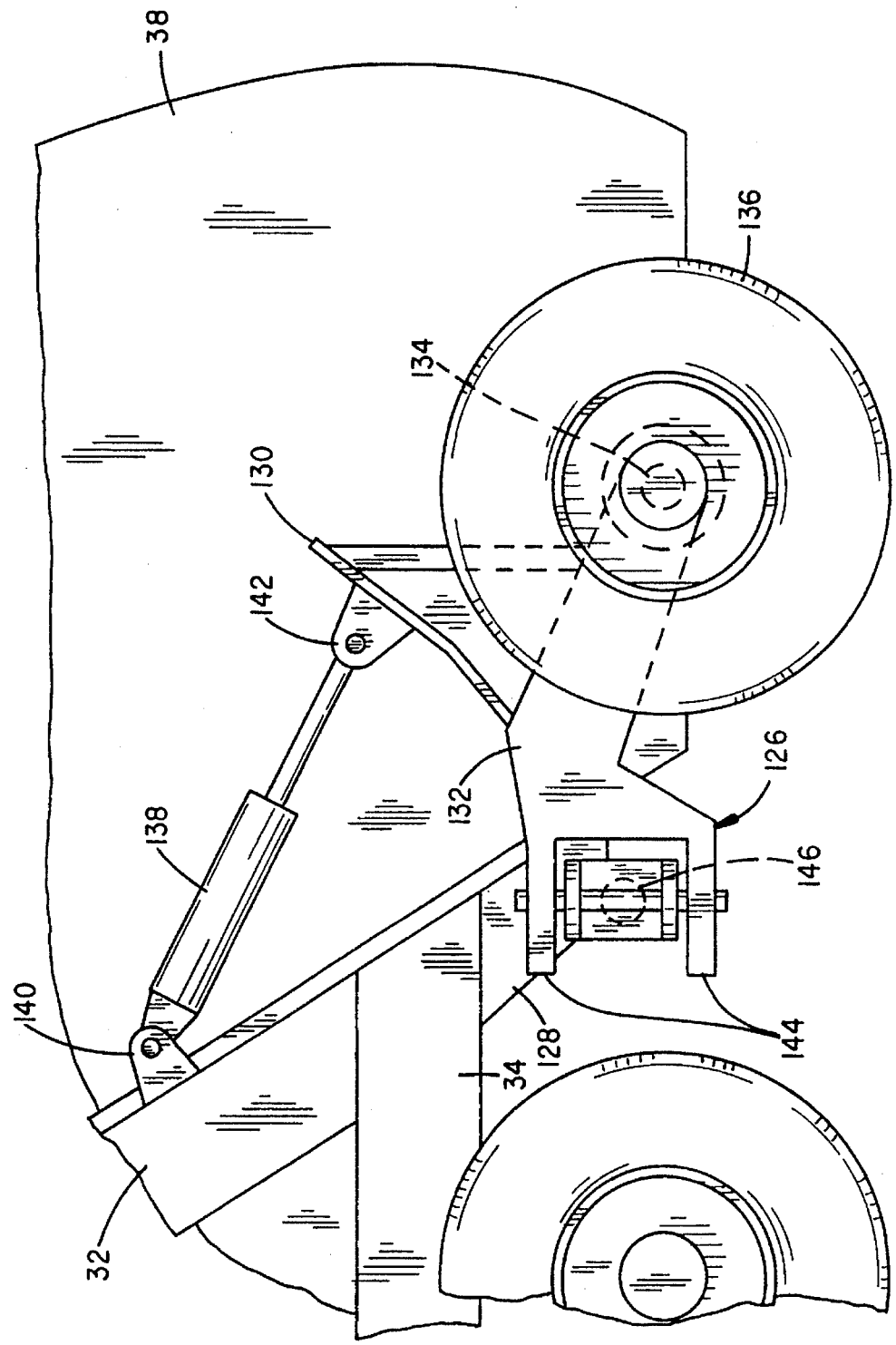
FIG. 15 is an enlarged fragmentary side view of another hydraulically operated steerable tag axle system including a kingpin pivot on a horizontal pivoting shaft.
Figure 16:
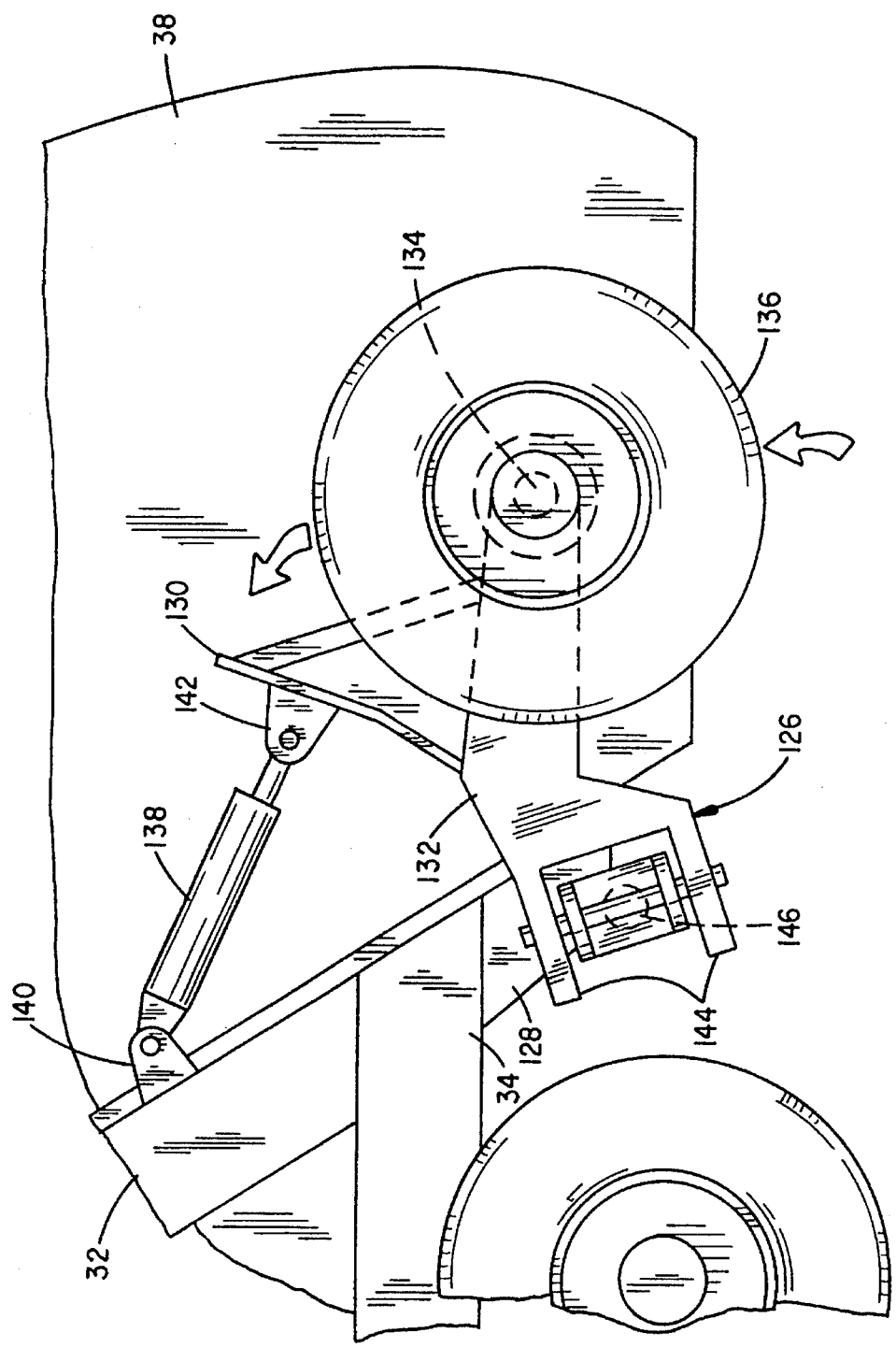
FIG. 16 is an enlarged fragmentary side view of the steerable tag axle system of FIG. 15 in the stowed position.
Figure 17:
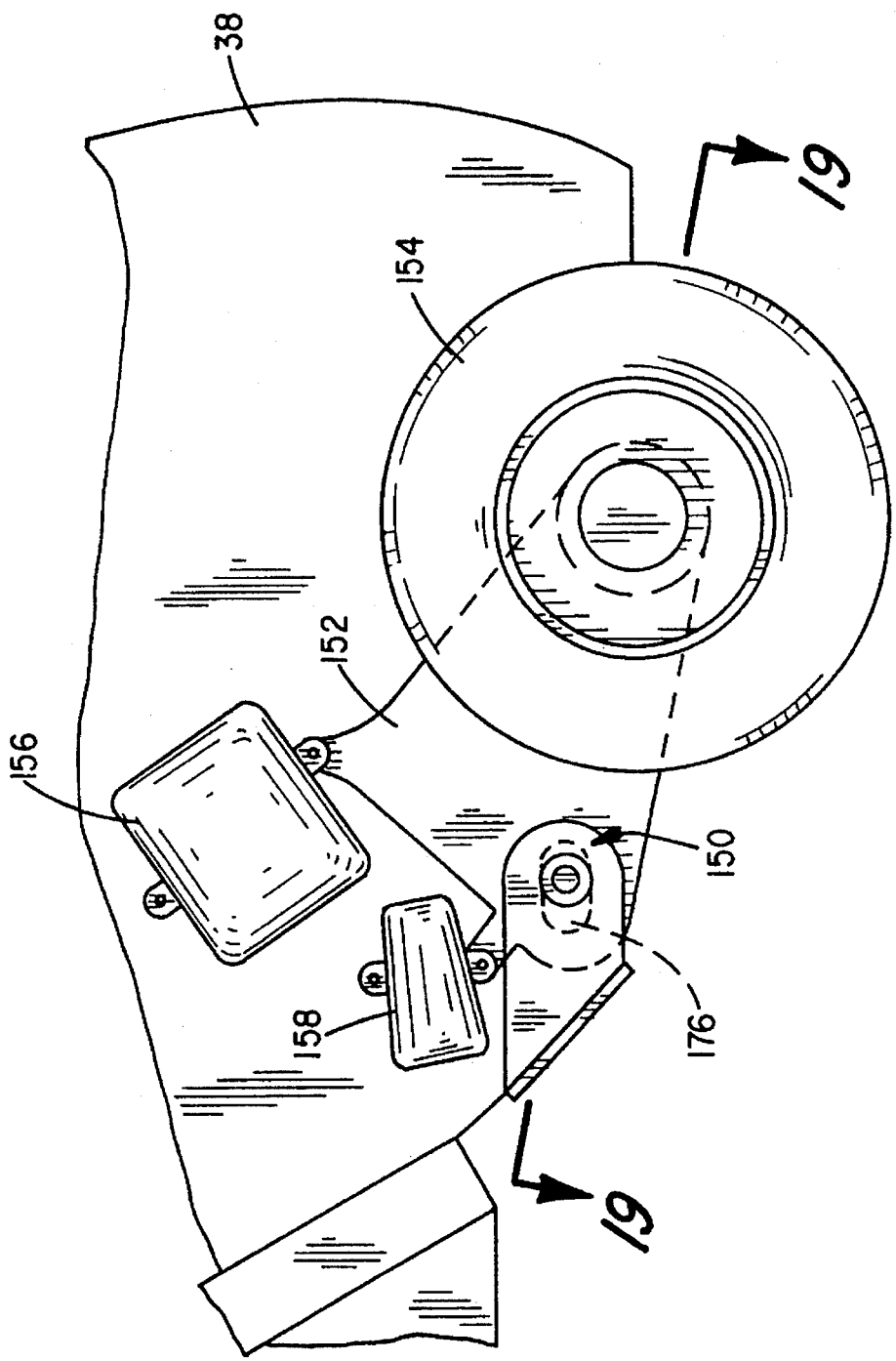
FIG. 17 is an enlarged fragmentary side view of a pivoting pneumatic spring operated steerable tag axle system including a spherical bearing.
Figure 18:
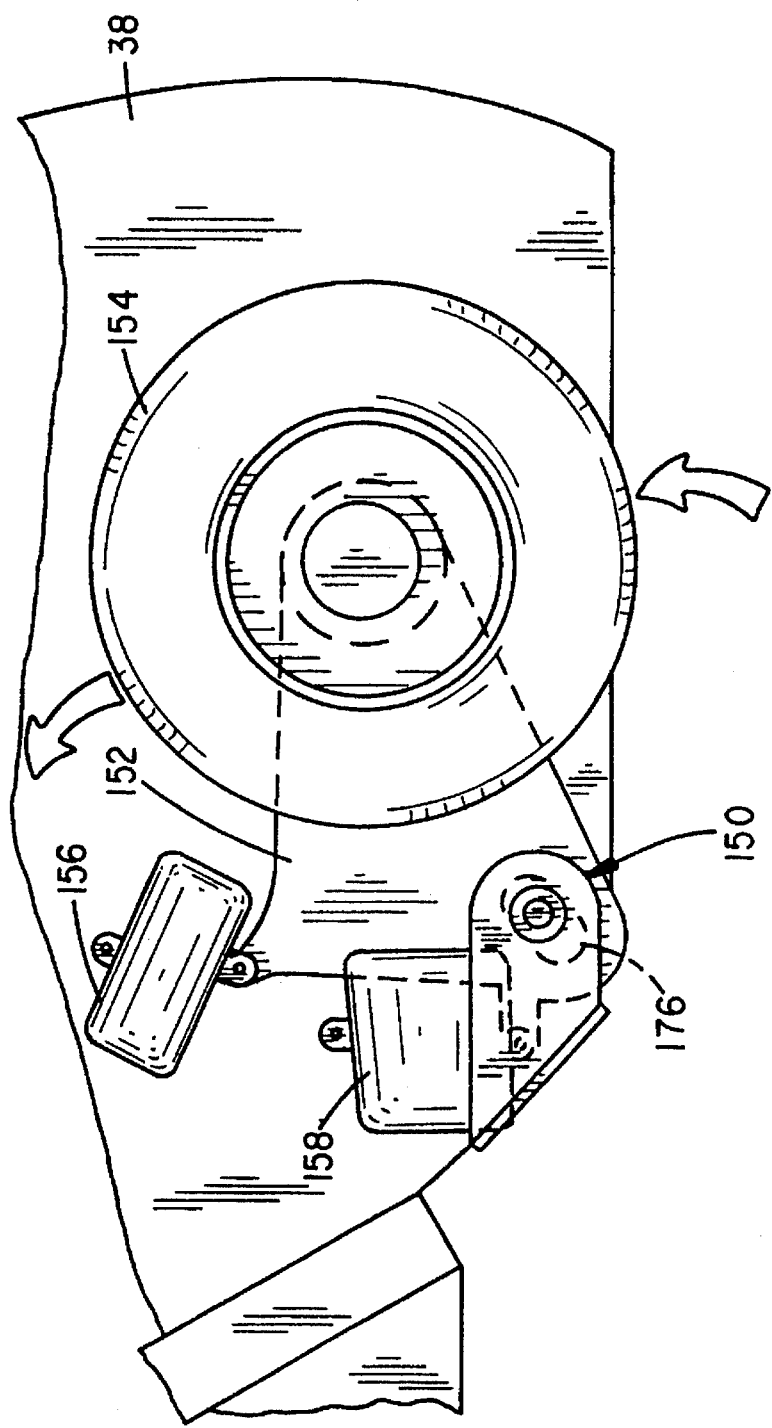
FIG. 18 is an enlarged fragmentary side view of the steerable tag axle system of FIG. 17 in the stowed position.

FIGS. 15 and 16, depict a slightly different steerable tag axle assembly 126 including a kingpin steering embodiment attached to a frame mount 128 which is securely attached to the frame 34. A faceplate 130 is secured to an axle mounting lever 132 which carries a stub axle 134 and wheel 136 and which may be either a tubular metal piece or sheet steel. A double acting hydraulic cylinder 138 is flexibly attached between body lug 140 which is secured to the body 32 and faceplate lug 142 which is secured to the faceplate 130 for moving the wheel 136 between the deployed and stowed positions. The axle mounting lever 132 includes a fork 144 which is pivotally attached to horizontal shaft 146 which is pivotally attached to the frame mount 128. The kingpin connection between the axle mounting lever 132 and the pivoting horizontal shaft 146 may be as shown in FIGS. 12–14 for axle mounting lever 104 and shaft 112. Lateral movement of the axle mounting lever 132 is likewise limited in the same way.

Another embodiment of the steering system as shown in FIGS. 17–20 includes a spherical bearing pivot assembly, indicated generally by the numeral 150. Axle mounting lever 152 carries a stub axle and wheel 154, and is pivotally connected to the tailgate 38 at spherical bearing pivot assembly 150 for movement between the deployed position, FIG. 17, and the stowed position, FIG. 18, as by pneumatic springs 156 and 158 attached between the tailgate 38 and the axle mounting lever 152.

Figure 19:
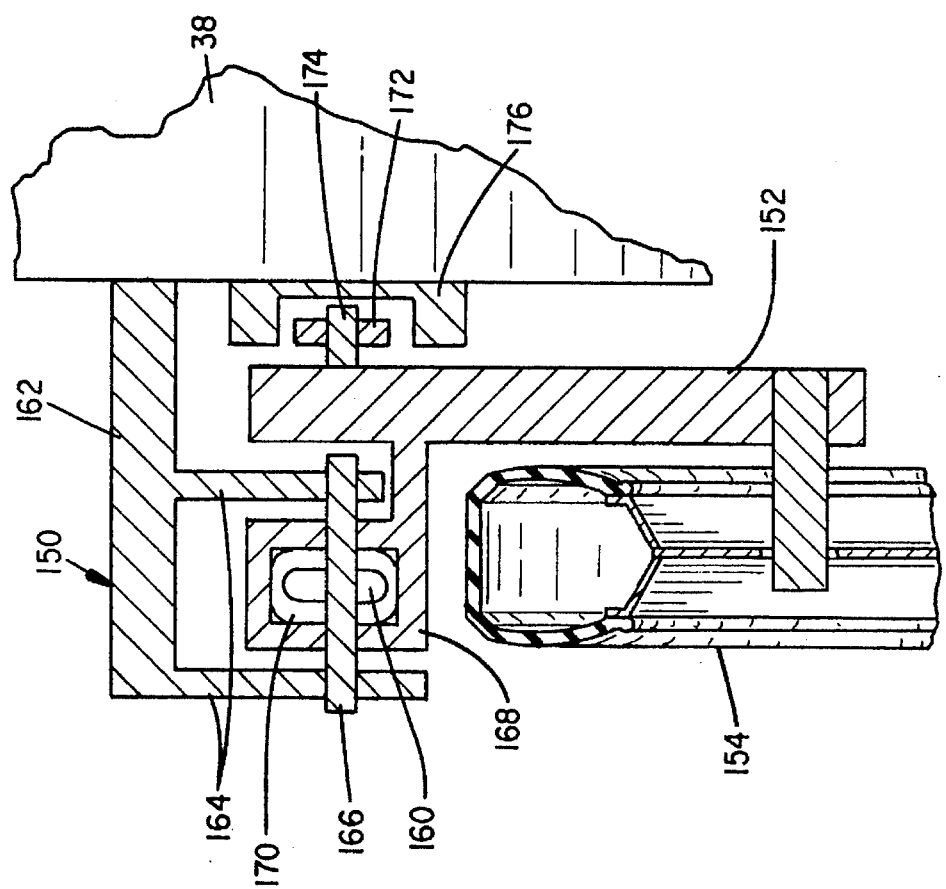
FIG. 19 is an enlarged fragmentary detail view taken along the line 19—19 in FIG. 17.

FIG. 19 shows a spherical bearing pivot assembly 150 including a spherical bearing 160 held by a bearing mount 162 securely attached to the tailgate 38. Mount flanges 164 carry a bearing shaft 166 which holds the spherical bearing 160 between flanges 164. Axle mounting lever 152 includes a lever support 168 having a bearing cavity 170 spherical bearing 160 mounted inside. Shaft 166 retains spherical bearing 160 in place. The lever support 168 is free to pivot laterally and between the deployed and stowed positions about the spherical bearing 160. Thus, the axle mounting levers 152 and 152A, FIG. 20, move vertically between the deployed and stowed positions and laterally for turning. Bumper roller 172 is attached to the axle mounting lever 152 with shaft 174 and inserted in a slot bracket 176, FIGS. 17–19, which is securely attached to the tailgate 38. The roller 172 and slot bracket 176 limit lateral movement of the axle mounting lever 152 and maintain the camber of the attached wheel 154.

Figure 20:
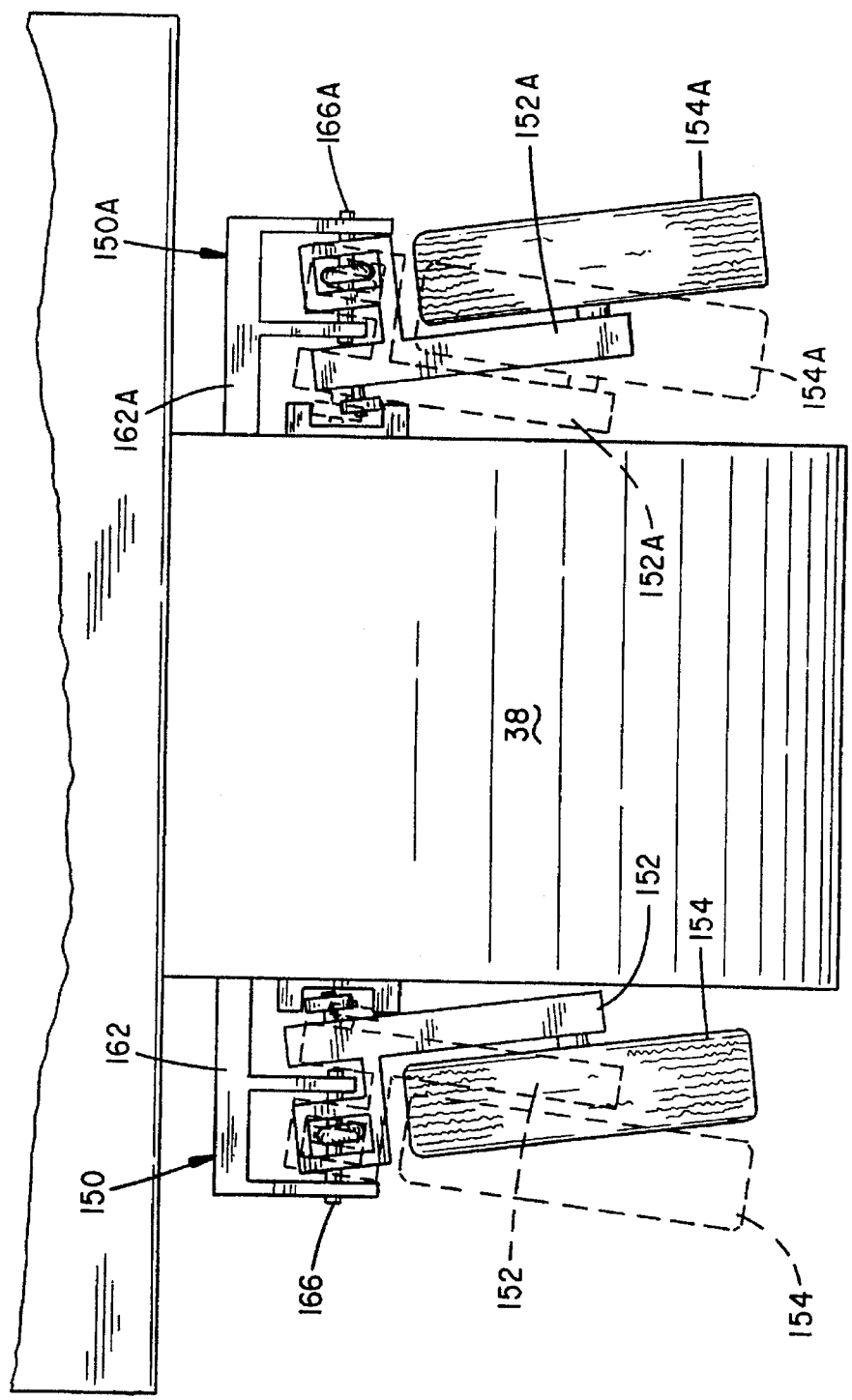
FIG. 20 is a plan view of the steerable tag axle system of FIG. 17 showing the axle mounting levers and wheels turned one way in solid lines and another in dashed lines.

FIG. 20 shows the axle mounting levers 152 and 152A displaced as indicated by solid lines or dashed lines in response to lateral forces exerted upon the wheels 154 and 154A by the ground. The levers 152 and 152A also pivot vertically about the shaft 166 and 166A between the deployed and stowed positions.

Figure 21:
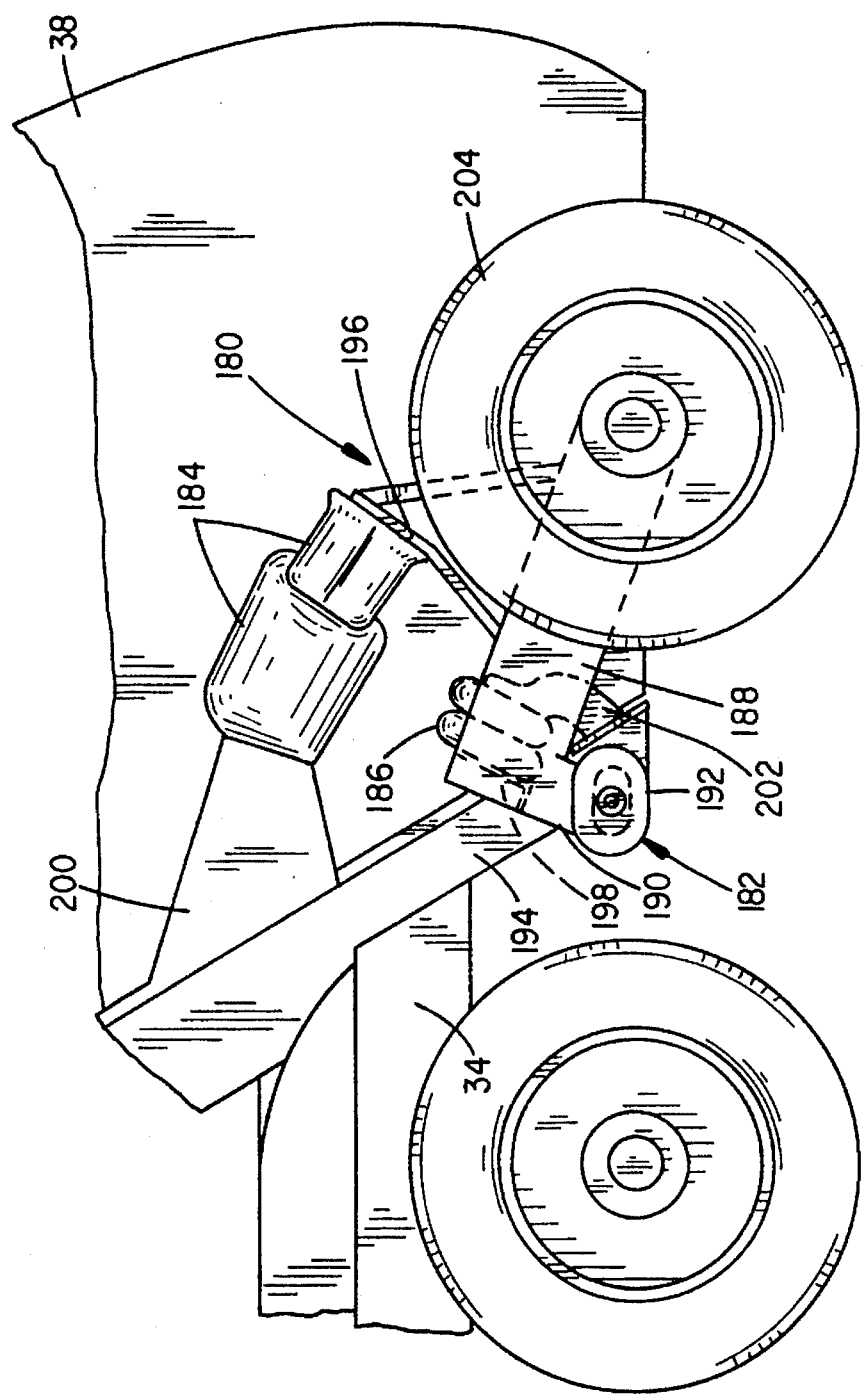
FIG. 21 is an enlarged fragmentary side view of a fixed pneumatic spring operated steerable tag axle system including a spherical bearing.
Figure 22:
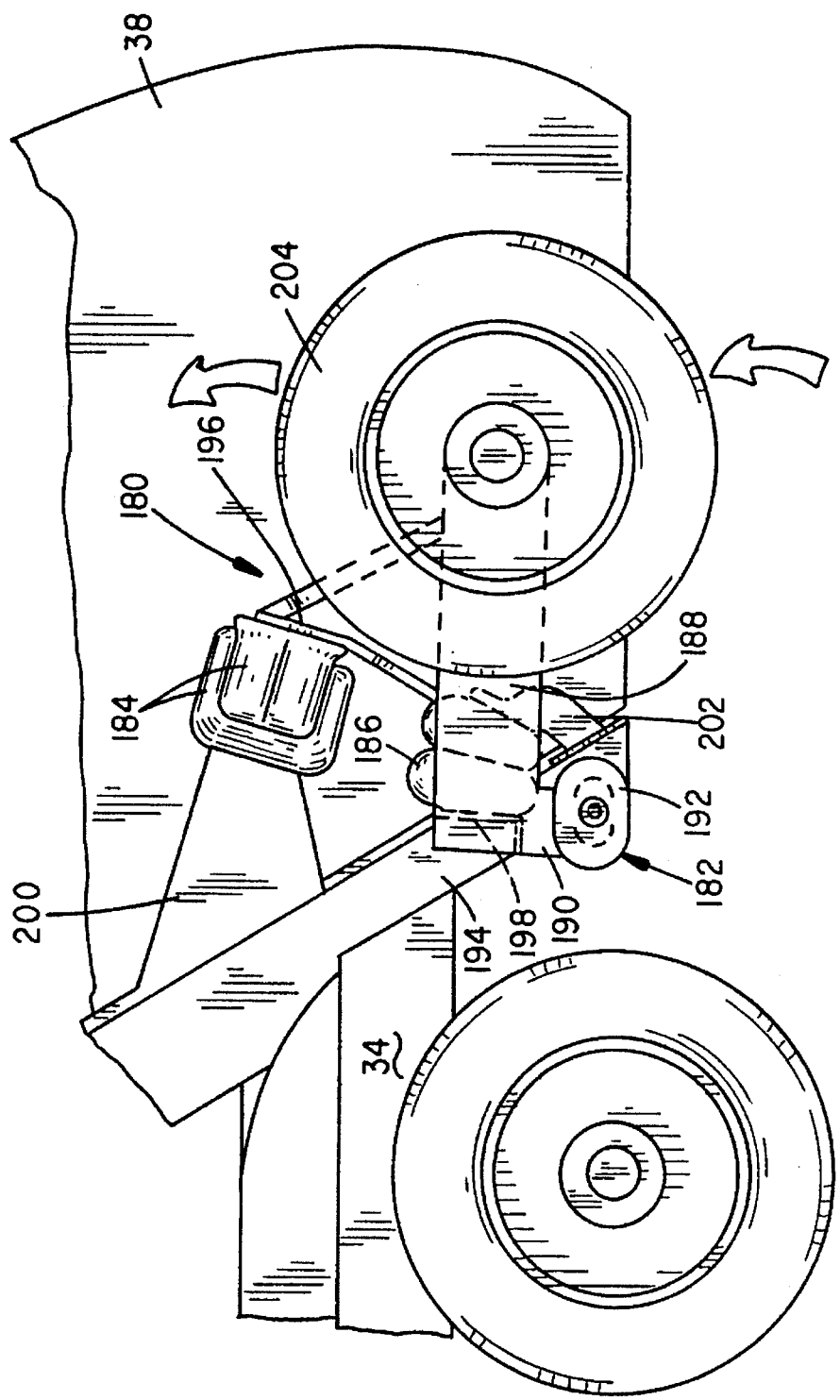
FIG. 22 is an enlarged fragmentary side view of the steerable tag axle system of FIG. 21 in the stowed position.

FIGS. 21 and 22 depict a different pneumatic spring operated tag axle assembly 180 including the spherical bearing steering system of the present invention, indicated by the reference numeral 182. The tag axle 180 includes an axle mounting lever 188 having an arm 190 which is rotatably or pivotally mounted to a bearing mount 192, in the same manner as the axle mounting lever 152 shown in FIGS. 19 and 20 is rotatably or pivotally mounted to the bearing mount 162. The axle mounting lever 188 may be either a tubular metal piece or heavy gauge sheet steel. The present bearing mount 192 is securely attached to a frame extension 194 which is secured to the frame 34, such as by welding and bolts. The arm 190 includes a slot roller (not shown) which is inserted in a slot bracket (not shown) securely attached to the frame extension 194.

The steerable tag axle assembly 180 includes a deploying faceplate 196 and a stowing faceplate 198 securely attached to the axle mounting lever 188. Pneumatic spring 184 is non-pivotally attached between the deploying faceplate 196 and a pneumatic spring mount 200 which is securely attached to the frame extension 194. In a similar manner, pneumatic spring 186 is non-pivotally attached between the stowing faceplate 198 and a pneumatic spring mount 202 which is securely attached to the frame extension 194. A wheel 204 carried by the axle mounting lever 188 is moved between the deployed, FIG. 21, and stowed, FIG. 22, positions by extending and retracting the springs 184 and 186.

Figure 23:
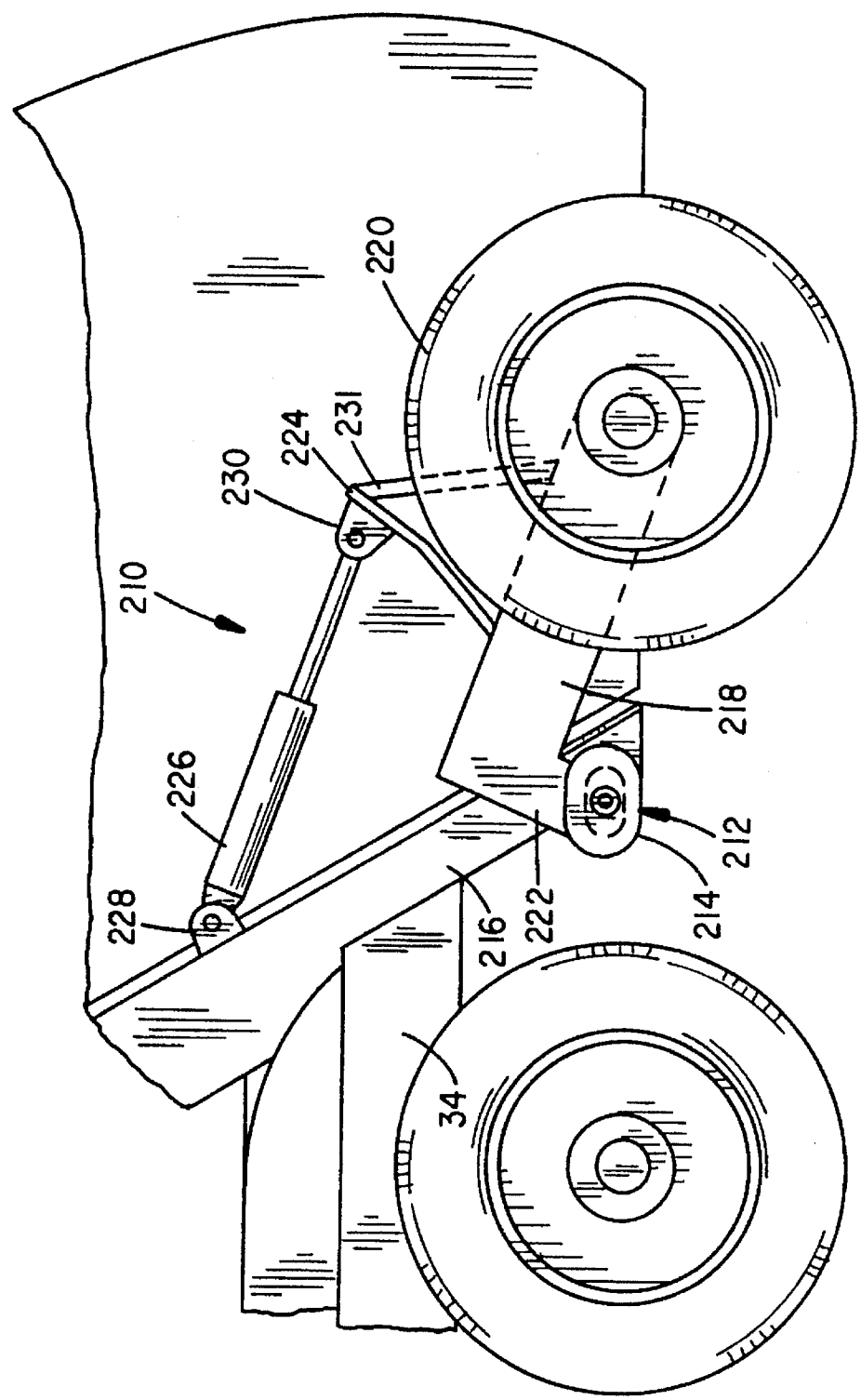
FIG. 23 is an enlarged fragmentary side view of an hydraulically operated steerable tag axle system including a spherical bearing.
Figure 24:
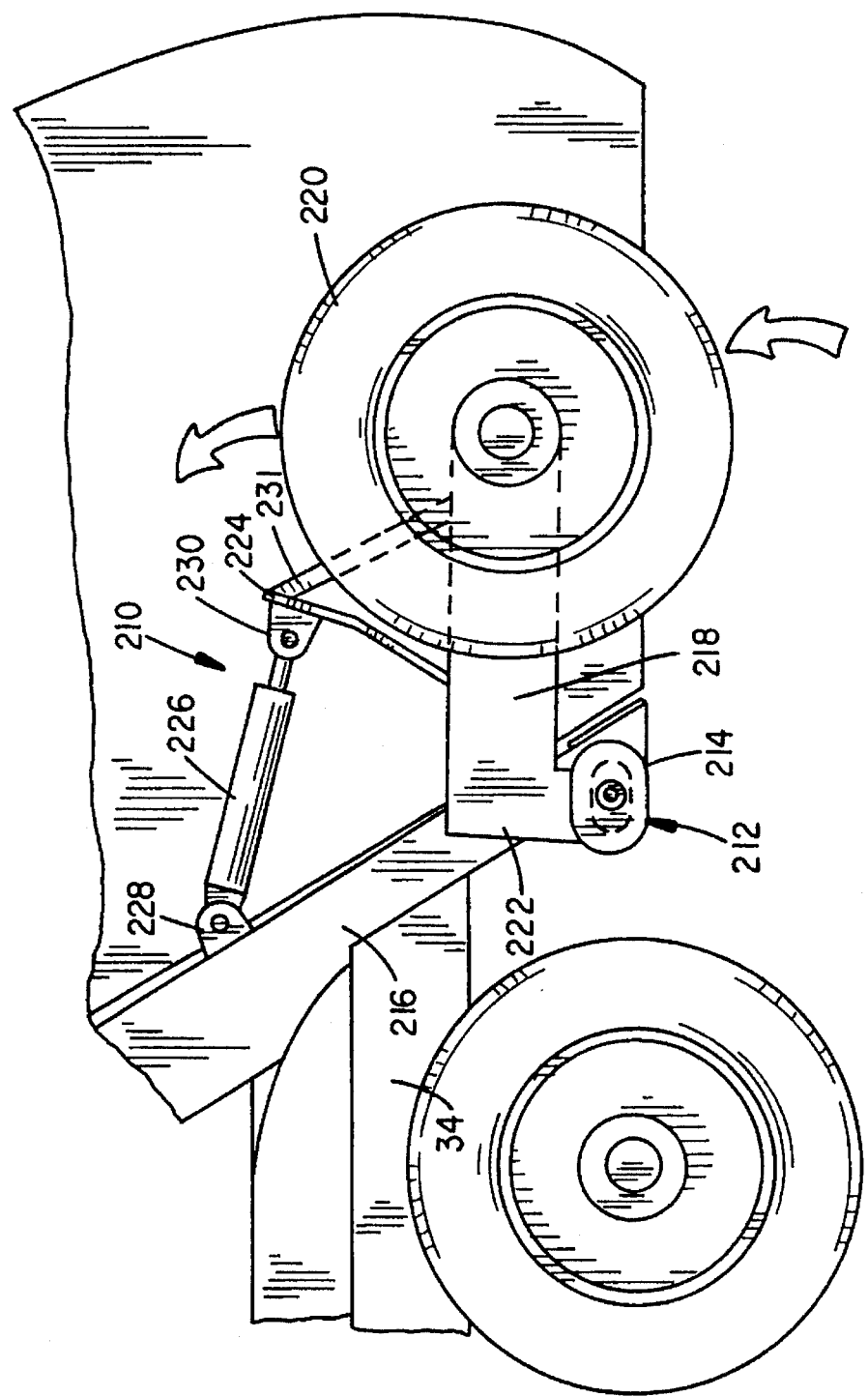
FIG. 24 is an enlarged fragmentary side view of the steerable tag axle system of FIG. 23 in the stowed position.

As shown in FIGS. 23 and 24, a double-acting hydraulic cylinder may replace the pneumatic springs of FIGS. 21 and 22. The tag axle assembly, generally at 210, includes spherical bearing steering system 212 having a bearing mount 214 which is mounted to frame extension 216 secured to frame 34. A tubular or steel plate axle mounting lever 218 carries a wheel 220 and has an arm 222 which is pivotally connected to the bearing mount 214 as previously 0 described for axle mounting lever 152 and bearing mount 162 in FIGS. 19 and 20. A deployment or operating lever 224 is securely attached to the axle mounting lever 218 and pivotally to the rod end of a double-acting hydraulic cylinder 226 by lug 230. Lug 228 connects the cylinder end to the frame extension 216. The wheel 220 is moved between the deployed, FIG. 23, and stowed, FIG. 24, positions by extending and retracting the cylinder 226. Additional leverage may be attained by adding a brace at 231.

Figure 25:
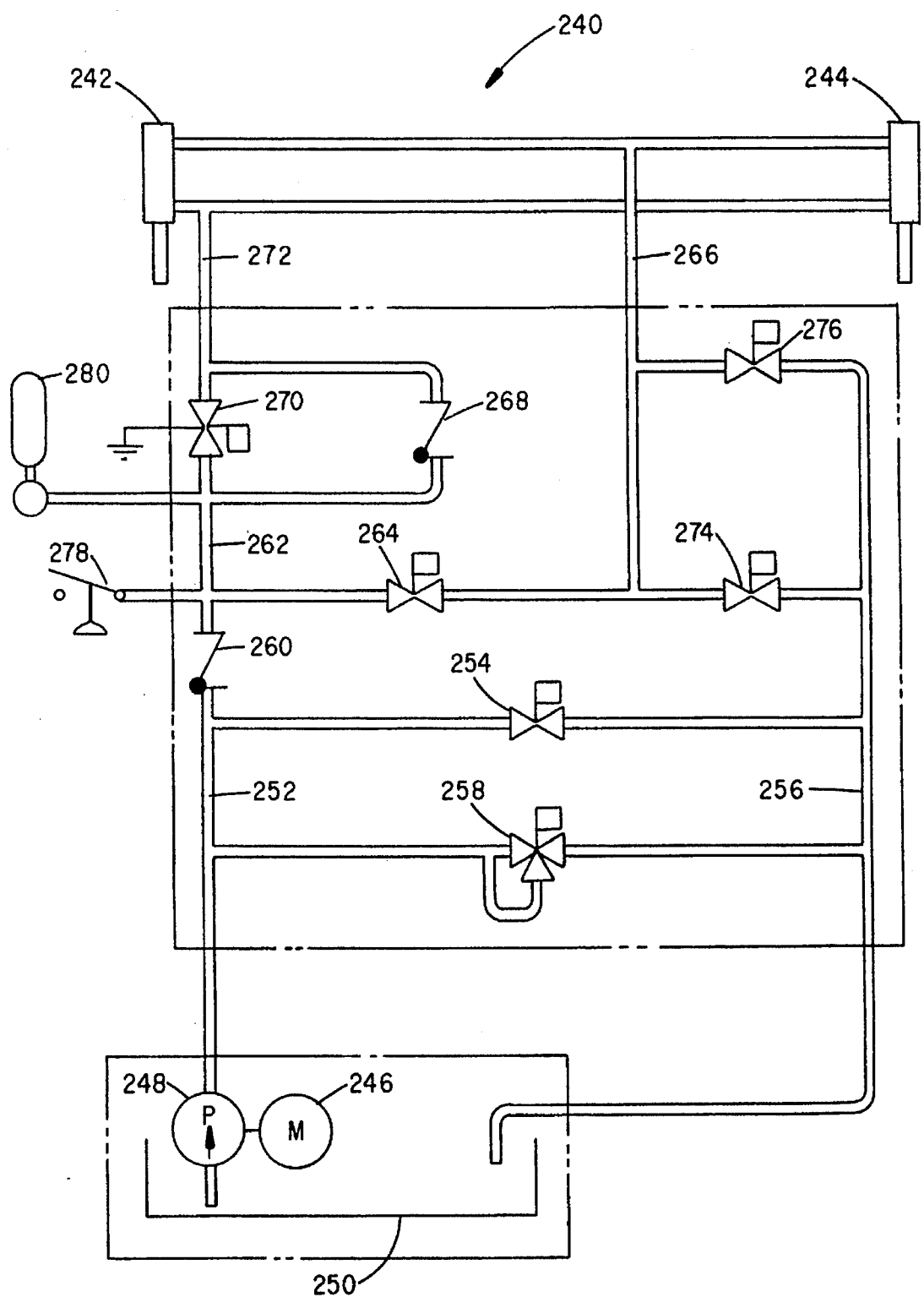
FIG. 25 is a schematic diagram of an hydraulic system for operating double-acting hydraulic cylinders.

FIG. 25 schematically illustrates a typical hydraulic system 240 for operating double-acting hydraulic cylinders such as 242 and 244 which may be used with any of the steerable tag axle systems described herein. The hydraulic system 240 includes a prime mover 246 which may be an alternator driven DC motor or other power source such as the engine of the vehicle connected to pump 248 which, in turn, draws hydraulic fluid from a reservoir tank 250 and pumps pressurized fluid into the system 240 in input line 252. The system includes a normally open (NO) solenoid operated dump valve 254 positioned between input line 252 and a return line 256. The dump valve 254 allows fluid to flow from the pump 248 to the return line 256 and directly back to the tank 250. A first safety relief valve 258 is positioned between the input line 252 and the return line 256 to prevent the pressure in the system 240 from exceeding a predetermined maximum value, e.g., 2400 PSI.

The system 240 includes a first check valve 260 which is connected between the input line 252 and an hydraulic fluid line 262. The first check valve 260 allows pressurized fluid to flow into the fluid line 262 and prevents back flow to the input line 252. A NO (normally open) solenoid operated valve 264 is connected between the fluid line 262 and a first cylinder fluid line 266 which is commonly connected to the full cylinder side of double acting hydraulic cylinders 242 and 244. A second check valve 268 is connected in parallel with a counter balance valve 270 between the fluid line 262 and a second cylinder fluid line 272 which is connected to the rod side of cylinders 242 and 244. A NC (normally closed) solenoid operated valve 274 is connected in parallel with a second relief valve 276 between first cylinder fluid line 266 and the return line 256. The second relief valve 276 insures that pressure in the system 240 does not exceed a maximum, such as 2400 PSI.

Operation of the system may be controlled from the cab. In operation, activating (closing) only the NO dump valve 254 extends the cylinders 242 and 244 to lower the tag axle system to the deployed position. Fluid is forced through the first check valve 260 and the NO valve 264 into the full cylinder side of hydraulic cylinders 242 and 244. Simultaneously, fluid is forced through the second check valve 268 and into the rod side of cylinders 242 and 244. Since the forces exerted on the full cylinder side are greater than those on the rod side, the cylinders 242 and 244 extend to lower the tag axle system to the deployed position. Fluid flows through the counter balance valve 270 from the rod side as the cylinders 242 and 244 extend. The first check valve 260 in combination with the NC valve 274 and the second relief valve 276 prevent fluid from flowing back to the tank 250 and essentially maintain pressure in the system.

Thus, once the tag axle system is in the deployed position the prime mover 246 and pump 248 do not have to continuously supply pressurized fluid to the first check valve 260. The mover 246 can be operated intermittently or, in the alternative, dump valve 254 can be opened and the pump 248 left running. Pressure switch 278 connected to fluid line 262 monitors the pressure in the system and if the pressure dips below a preset minimum, such as about 1900 PSI, turns the pump 248 on, if necessary, and closes the dump valve 254, if required. The accumulator 280 stores high pressure fluid to assist the system in maintaining the desired pressure level.

To raise the tag axle system, NO dump valve 254 and NO valve 264 are closed and NC valve 274 is opened. This allows fluid from cylinders 242 and 244 to drain through cylinder fluid line 266 and NC valve 274 as fluid is forced into the rod side of the cylinders 242 and 244 through first check valve 260 and second check valve 268. The cylinders 242 and 244 retract and raise the tag axle system. Once the tag axle system is in the stowed position, first check valve 260 and activated NO valve 264 maintain the fluid in the rod side of the cylinders 242 and 244 with the pump operating as above to recharge the accumulator 280 and restore pressure to the system as needed.

The steerable tag axle systems including the embodiments of the present invention have been shown attached to a rear loading refuse vehicle 30. Of course, the systems could be attached to any load hauling vehicle, including front loading and side loading refuse vehicles, and they could be attached at the rear of the vehicle or between the front and rear axles.

Figure 26:
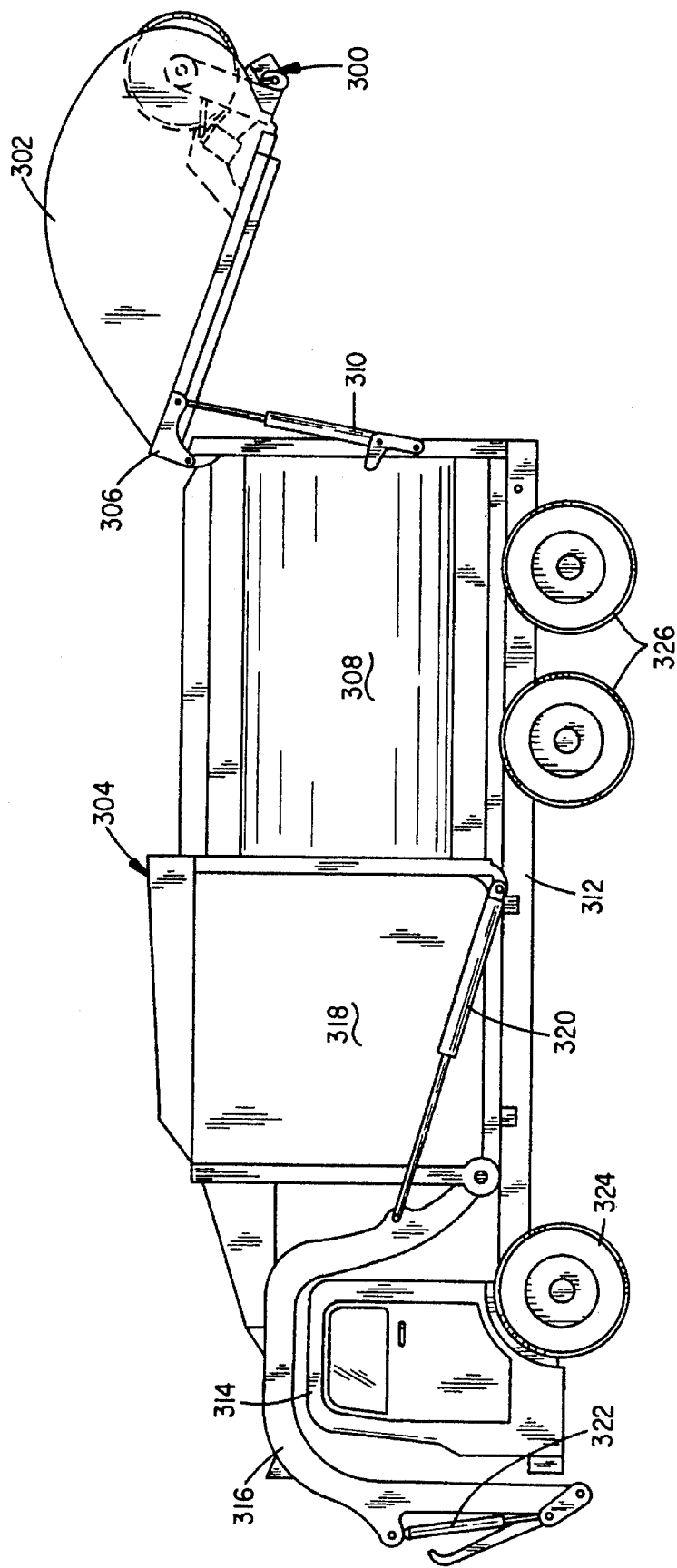
FIG. 26 is a side view of a front loading refuse truck showing a tailgate mounted steerable tag axle system in the stowed position and the tailgate raised for unloading.
Figure 27:
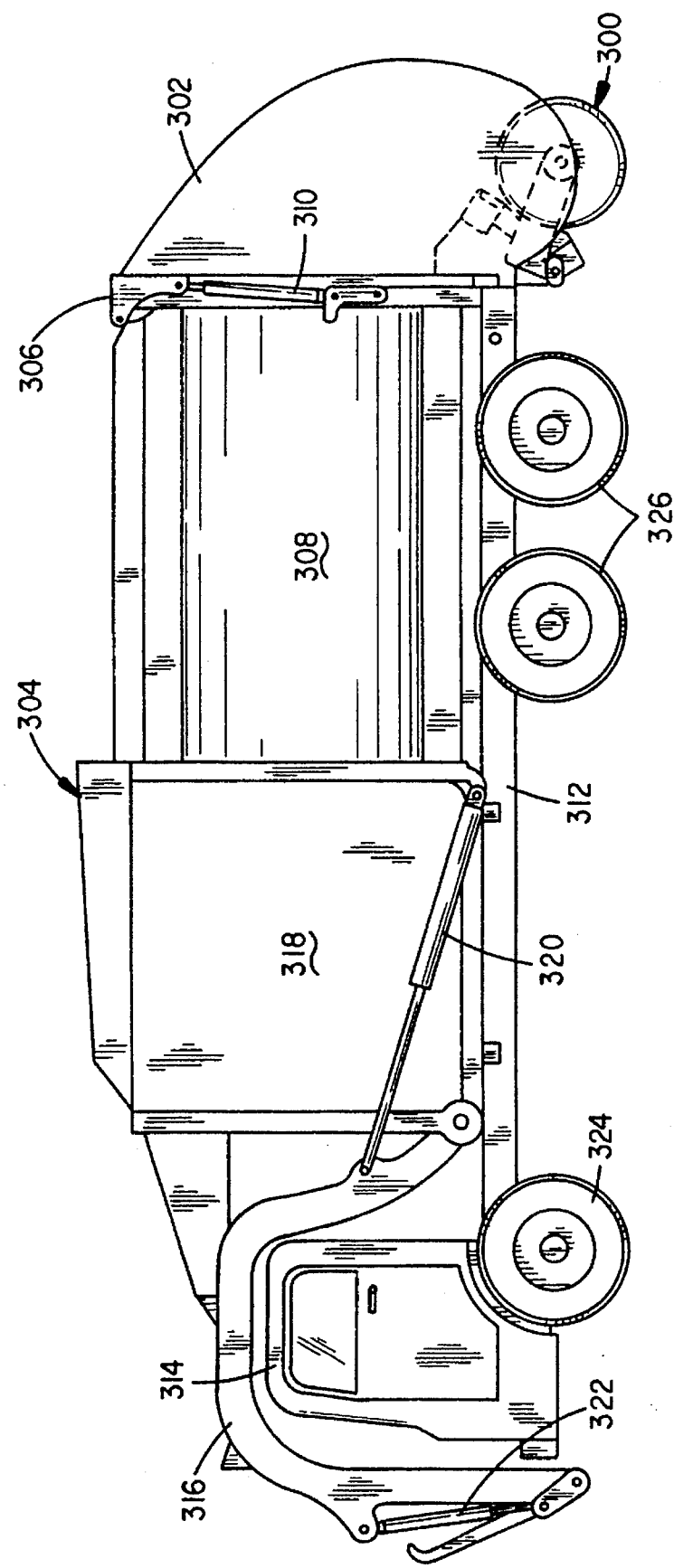
FIG. 27 is a side view of the refuse truck of FIG. 26 showing the steerable tag axle system in the deployed position.

For example, FIGS. 26 and 27 show a spherical bearing steerable tag axle system 300 (FIGS. 21 and 22) attached to the tailgate 302 of a front loading refuse vehicle 304. The tailgate 302 is pivotally attached with hinge member 306 to material holding body 308 and moved between a closed and a raised position by tailgate hydraulic cylinder 310. The body 308 is attached to a frame 312 which also carries a cab section 314 and a lift and dump mechanism 316, built to empty refuse containers into a refuse receiving hopper 318. Lift and dump hydraulic cylinders 320 and 322 operate the mechanism 316 to empty refuse containers into the receiving hopper 318 where the refuse is compacted to the rear of the body 308 by an hydraulic compactor (not shown). The tailgate 302 carrying the steerable tag axle system 300 is locked shut for compacting and the steerable tag axle system 300 is put into the ground engaging position, as shown in FIG. 27, to redistribute the weight among the front wheels 324 and rear wheels 326. To unload the vehicle 304, tailgate 302 is raised by extending tailgate hydraulic cylinder 310 and refuse is pushed out of the body 308. Of course, the steerable tag axle system 300 may be moved to the stowed position before raising tailgate 302 as in FIG. 26.

Figure 28:
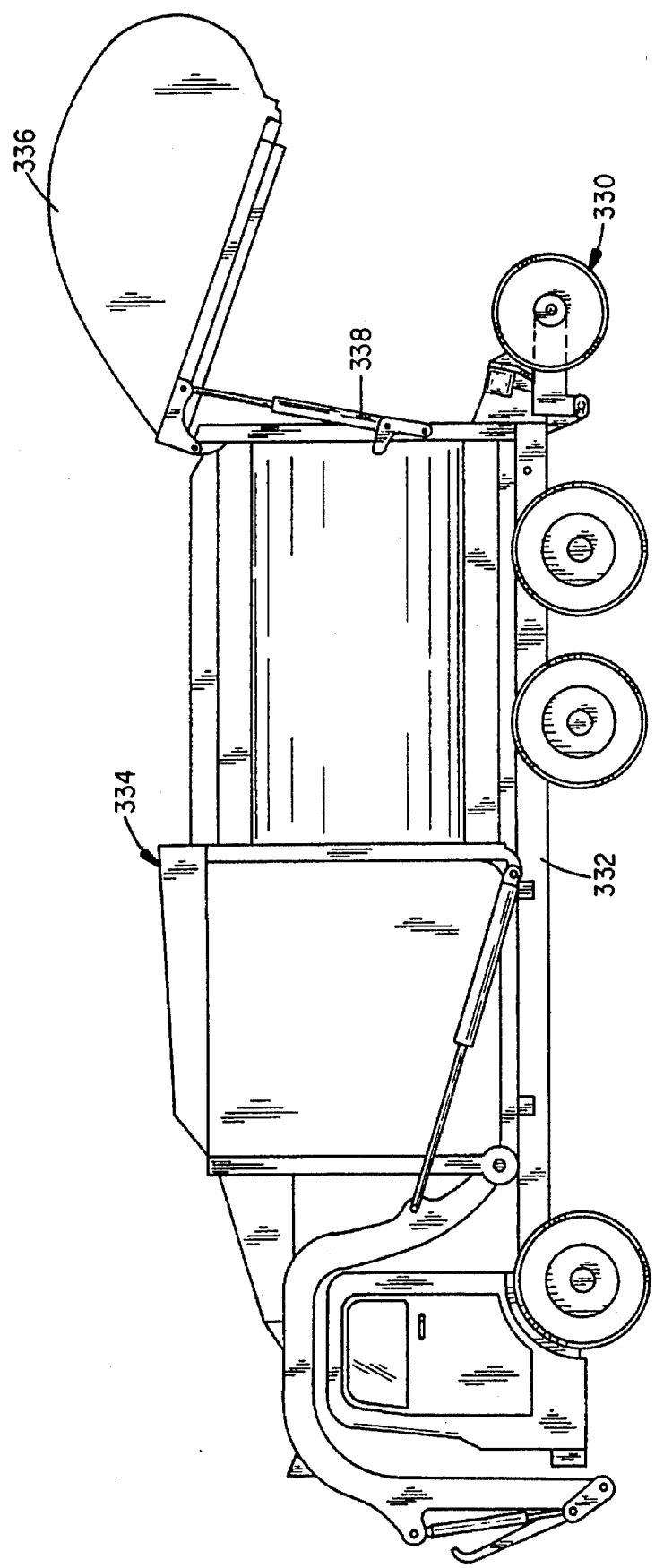
FIG. 28 is a side view of a front loading refuse truck showing a frame mounted steerable tag axle system in the stowed position and the tailgate raised for unloading.
Figure 29:
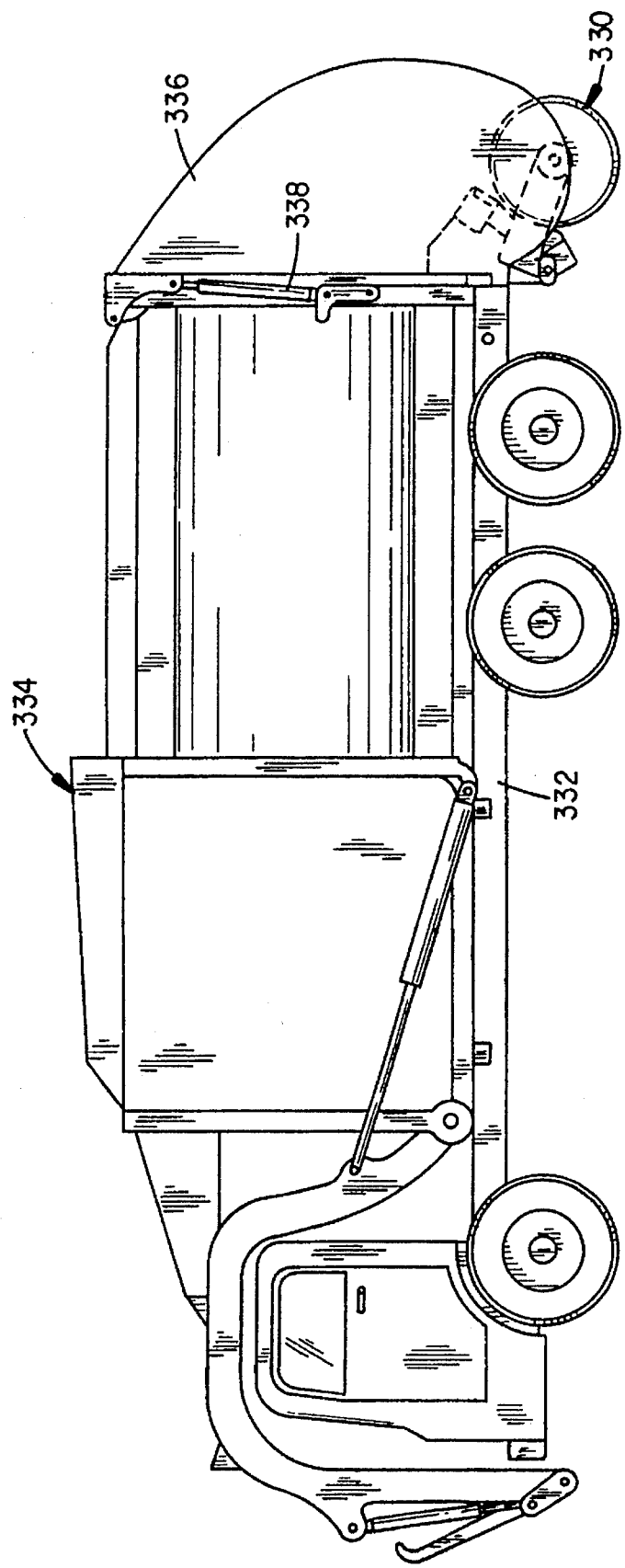
FIG. 29 is a side view of the refuse truck of FIG. 28 showing the steerable tag axle system in the deployed position.

In FIGS. 28 and 29, a spherical bearing steerable tag axle system 330 is shown attached to the frame 332 of a front loading vehicle 334. The steerable tag axle system 330 may be raised to the stowed position, FIG. 28, or deployed to the ground engaging position, FIG. 29. Tailgate 336 is raised by tailgate hydraulic cylinder 338 to unload the vehicle 334. Since, the tag axle system 330 is of the stub axle variety, it does not interfere with unloading operations.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention.

What is claimed is:

1. A steerable auxiliary wheel system for a vehicle, including a pair of spaced steerable tag axle assemblies each of which comprises:

(a) a suspension system including an axle mounting lever movably pivotally attached to the vehicle and carrying a stub axle and a wheel on the stub axle;

(b) fluid operated actuator means connected to said suspension system for moving the axle mounting lever and the wheel between a deployed position and a stowed position;

(c) steering means attached to the axle mounting lever for allowing lateral adjustment of the wheel; and (d) wherein said steering means comprises a kingpin steering system having a pivot pin connecting the axle mounting lever to a pivot attached to the vehicle such that the axle mounting lever pivots laterally about said pivot pin and between the deployed and stowed positions at said pivot.

2. The system as in claim 1 further comprising means for limiting lateral movement of the axle mounting lever.

3. The system as in claim 1 wherein said fluid operated actuator means is a first and a second fluid operated actuator.

4. The system as in claim 3 wherein said first and said second fluid operated actuators are pivotally attached to the axle mounting lever and the vehicle.

5. The system as in claim 3 wherein said first and said second fluid operated actuators are pneumatic springs mounted in fixed relation to the axle mounting lever and the vehicle.

6. The system as in claim 1 wherein said fluid operated actuator means comprises a double-acting hydraulic cylinder connected to the axle mounting lever.

7. The system as in claim 1 wherein the vehicle includes a tailgate and the pair of spaced steerable tag axle assemblies are attached to said tailgate.

8. The system as in claim 7 wherein the vehicle is a truck selected from the group consisting of a rear loading refuse truck, a front loading refuse truck and a side loading refuse truck.

9. The system as in claim 1 wherein the vehicle has a frame and the pair of spaced steerable tag axle assemblies are attached to said frame.

10. The system as in claim 9 wherein the vehicle is a truck selected from the group consisting of a rear loading refuse truck, a front loading refuse truck and a side loading refuse truck.

11. The system as in claim 1 wherein the vehicle is a truck selected from the group consisting of a rear loading refuse truck, a front loading refuse truck and a side loading refuse truck.

12. A steerable auxiliary wheel system for a vehicle, including a pair of spaced steerable tag axle assemblies each of which comprises:

(a) a suspension system including an axle mounting lever movably pivotally attached to the vehicle and carrying a stub axle and a wheel on the stub axle;

(b) fluid operated actuator means connected to said suspension system for moving the axle mounting lever and the wheel between a deployed position and a stowed position;

(c) steering means attached to the axle mounting lever for allowing lateral adjustment of the wheel; and (d) wherein said steering means further comprises a spherical bearing carried by a spherical bearing mount attached to the vehicle and further wherein the axle mounting lever has a bearing cavity which engages the spherical bearing in a manner that provides two degrees of freedom such that the axle mounting lever can pivot laterally and between the deployed and stowed positions on said spherical bearing.

13. The system as in claim 12 wherein said fluid operated actuator means comprises a first and a second fluid operated actuator.

14. The system as in claim 13 wherein said first and said second fluid operated actuators are pivotally attached to the axle mounting lever and the vehicle.

15. The system as in claim 13 wherein said first and said second fluid operated actuators are pneumatic springs mounted in fixed relation to the axle mounting lever and the vehicle.

16. The system as in claim 12 wherein said fluid operated actuator means comprises a double-acting hydraulic cylinder.

17. The system as in claim 12 wherein the vehicle includes a tailgate and the spaced steerable tag axle assemblies are attached to said tailgate.

18. The system as in claim 17 wherein the vehicle is a truck selected from the group consisting of a rear loading refuse truck, a front loading refuse truck and a side loading refuse truck.

19. The system as in claim 12 wherein the vehicle has a frame and the spaced steerable tag axle assemblies are attached to said frame.

20. The system as in claim 19 wherein the vehicle is a truck selected from the group consisting of a rear loading refuse truck, a front loading refuse truck and a side loading refuse truck.

21. The system as in claim 11 wherein the vehicle is a truck selected from the group consisting of a rear loading refuse truck, a front loading refuse truck and a side loading refuse truck.

22. A steerable auxiliary wheel system for a vehicle, including a pair of spaced steerable tag axle assemblies each of which comprises:

(a) a suspension system including an axle mounting lever movably pivotally attached to the vehicle and carrying a stub axle and a wheel on the stub axle;

(b) fluid operated actuator means connected to said suspension system for moving the axle mounting lever and the wheel between a deployed position and a stowed position; wherein said fluid operated actuator means comprises a double-acting hydraulic cylinder having a rod side connected to the axle mounting lever and a cylinder side;

(c) spherical bearing steering means comprising spherical bearing carried by a spherical bearing mount attached to the vehicle and further wherein the axle mounting lever has a bearing cavity which engages the spherical bearing in a manner that provides two degrees of freedom such that the axle mounting lever can pivot laterally and between the deployed and stowed positions on said spherical bearing; and (d) an hydraulic system for operating said double-acting hydraulic cylinder comprising;

(i) a prime mover and pump for pressurizing hydraulic fluid, (ii) flow means for supplying and releasing pressurized fluid from the rod and cylinder sides, and (iii) regulation means for keeping the hydraulic fluid pressure at the double-acting hydraulic cylinder above a predetermined minimum and below a predetermined maximum value.

23. The system as in claim 22 wherein the regulation means comprises a check valve positioned between the double-acting hydraulic cylinder and the pump and further comprising a pressure switch and an accumulator positioned on the hydraulic cylinder side of the check valve for monitoring the pressure and storing pressurized fluid to maintain the pressure above the predetermined minimum value.

24. The system as in claim 23 wherein the regulation means further comprises at least one safety valve positioned to release fluid back to the pump if the pressure exceeds the predetermined maximum value.

25. The system as in claim 22 wherein the flow means comprises a check valve and a counter balance valve connected in parallel between a fluid supply line and the cylinder such that hydraulic fluid flows to the cylinder through the check valve and away from the cylinder through the counter balance valve.

26. A steerable auxiliary wheel system for a vehicle, including a pair of spaced steerable tag axle assemblies each of which comprises:

(a) a suspension system including an axle mounting lever movably pivotally attached to the vehicle and carrying a stub axle and a wheel on the stub axle;

(b) fluid operated actuator means connected to said suspension system for moving the axle mounting lever and the wheel between a deployed position and a stowed position;

(c) steering means attached to the axle mounting lever for allowing lateral adjustment of the wheel; and (d) wherein said steering means comprises a kingpin steering system having a pivot pin connecting the stub axle to the axle mounting lever for lateral movement of the stub axle and an elongated lever arm attached to each stub axle of the pair of spaced steerable tag axle assemblies, wherein said elongated lever arms are attached to a rod means for maintaining the stub axles in alignment.

27. The system as in claim 26 wherein the vehicle is a truck selected from the group consisting of a rear loading refuse truck, a front loading refuse truck and a side loading refuse truck.

28. A steerable auxiliary wheel system for a vehicle, including a pair of spaced steerable tag axle assemblies each of which comprises:

(a) a suspension system including an axle mounting lever movably pivotally attached to the vehicle and carrying a stub axle and a wheel on the stub axle;

(b) fluid operated actuator means connected to said suspension system for moving the axle mounting lever and the wheel between a deployed position and a stowed position;

(c) steering means attached to the axle mounting lever for allowing lateral adjustment of the wheel; and (d) wherein said steering means further comprises a spherical bearing.

29. The system as in claim 28 wherein the vehicle is a truck selected from the group consisting of a rear loading refuse truck, a front loading refuse truck and a side loading refuse truck.

* * * * *